(12) United States Patent
Gu et al.

(10) Patent No.: US 11,372,768 B2
(45) Date of Patent: Jun. 28, 2022

(54) METHODS AND SYSTEMS FOR FETCHING DATA FOR AN ACCELERATOR

(71) Applicant: ALIBABA GROUP HOLDING LIMITED, Grand Cayman (KY)

(72) Inventors: Yongbin Gu, San Mateo, CA (US); Pengcheng Li, San Mateo, CA (US); Tao Zhang, San Mateo, CA (US)

(73) Assignee: Alibaba Group Holding Limited, George Town (KY)

( * ) Notice: Subject to any disclaimer, the term of this patent is extended or adjusted under 35 U.S.C. 154(b) by 13 days.

(21) Appl. No.: 16/900,215

(22) Filed: Jun. 12, 2020

(65) Prior Publication Data

US 2021/0157737 A1  May 27, 2021

Related U.S. Application Data

(60) Provisional application No. 62/940,178, filed on Nov. 25, 2019.

(51) Int. Cl.
*G06F 12/08* (2016.01)
*G06F 11/30* (2006.01)
(Continued)

(52) U.S. Cl.
CPC ...... *G06F 12/0882* (2013.01); *G06F 11/0772* (2013.01); *G06F 11/3037* (2013.01);
(Continued)

(58) Field of Classification Search
CPC ............ G06F 12/0882; G06F 12/0811; G06F 12/0862; G06F 12/1009; G06F 11/3037; G06F 11/0772; G06F 12/0895
See application file for complete search history.

(56) References Cited

U.S. PATENT DOCUMENTS

2014/0229682 A1   8/2014  Poremba et al.
2015/0278099 A1  10/2015  Jain et al.
(Continued)

FOREIGN PATENT DOCUMENTS

CN    104915322 A    9/2015

OTHER PUBLICATIONS

International Search Report and written opinion in related International Application No. PCT/US20/58189, dated Feb. 2, 2021 (12 pgs.).

*Primary Examiner* — Masud K Khan
(74) *Attorney, Agent, or Firm* — Finnegan, Henderson, Farabow, Garrett & Dunner, LLP

(57) ABSTRACT

The present disclosure provides methods, systems, and non-transitory computer readable media for fetching data for an accelerator. The methods include detecting an attempt to access a first page of data that is not stored on a primary storage unit of the accelerator, wherein the first page of data corresponds to part of an array with a number of dimensions; and responsive to detecting the attempt to access the first page of data: dividing the array into sub-arrays by: dividing the array into a number of 1st level sub-arrays, and dividing a first 1st level sub-array into a number of 2nd level sub-arrays, wherein the first 1st level sub-array contains the first page of data; selecting pages for prefetching, wherein selecting pages for prefetching includes selecting all pages in a first 2nd level sub-array for prefetching if the first 2nd level sub-array meets a page access volume condition, wherein the first 2nd level sub-array contains the first page of data; and transferring the first page of data and any pages of data selected for prefetching from a memory system connected to the accelerator into the primary storage unit.

27 Claims, 18 Drawing Sheets

(51) Int. Cl.
  *G06F 11/07*     (2006.01)
  *G06F 12/0882*   (2016.01)
  *G06F 12/0811*   (2016.01)
  *G06F 12/0862*   (2016.01)
  *G06F 12/1009*   (2016.01)
  *G06F 12/0895*   (2016.01)

(52) U.S. Cl.
  CPC ...... *G06F 12/0811* (2013.01); *G06F 12/0862* (2013.01); *G06F 12/0895* (2013.01); *G06F 12/1009* (2013.01)

(56) References Cited

U.S. PATENT DOCUMENTS

| | | | |
|---|---|---|---|
| 2015/0363318 A1* | 12/2015 | Redford | G06F 12/0864 711/128 |
| 2018/0189239 A1 | 7/2018 | Nurvitadhi et al. | |
| 2021/0109860 A1* | 4/2021 | Gottin | G06F 12/0882 |

* cited by examiner

METHODS AND SYSTEMS FOR FETCHING DATA FOR AN ACCELERATOR

CROSS-REFERENCE TO RELATED APPLICATION

This disclosure claims the benefit of priority to U.S. Provisional Patent Application No. 62/940,178, filed on Nov. 25, 2019, which is incorporated herein by reference in its entirety.

TECHNICAL FIELD

The present disclosure generally relates to accelerators, and more particularly, to methods, systems, and non-transitory computer readable media for fetching data for us by an accelerator.

BACKGROUND

Heterogenous computer systems employing accelerators have become an important component of many modern-day computer systems. Many of these computer systems employ a unified virtual memory architecture, allowing central processing units and accelerators to share a virtual memory space. While beneficial, managing a unified virtual memory space can present challenges, with memory oversubscription, frequent page migrations between primary storage units, and inefficient memory usage all being potential causes of degraded system performance. An important component of handling these challenges is prefetching, which, if done inefficiently, can degrade system performance.

SUMMARY OF THE DISCLOSURE

The embodiments of the present disclosure provide methods, systems, and non-transitory computer readable media for fetching data for an accelerator. The methods include detecting an attempt to access a first page of data that is not stored on a primary storage unit of the accelerator, wherein the first page of data corresponds to part of an array with a number of dimensions; and responsive to detecting the attempt to access the first page of data: dividing the array into sub-arrays by: dividing the array into a number of 1st level sub-arrays, and dividing a first 1st level sub-array into a number of 2nd level sub-arrays, wherein the first 1st level sub-array contains the first page of data; selecting pages for prefetching, wherein selecting pages for prefetching includes selecting all pages in a first 2nd level sub-array for prefetching if the first 2nd level sub-array meets a page access volume condition, wherein the first 2nd level sub-array contains the first page of data; and transferring the first page of data and any pages of data selected for prefetching from a memory system connected to the accelerator into the primary storage unit.

Additional objects and advantages of the disclosed embodiments will be set forth in part in the following description, and in part will be apparent from the description, or may be learned by practice of the embodiments. The objects and advantages of the disclosed embodiments may be realized and attained by the elements and combinations set forth in the claims.

It is to be understood that the foregoing general description and the following detailed description are exemplary and explanatory only, and are not restrictive of the invention, as claimed.

BRIEF DESCRIPTION OF THE DRAWINGS

Embodiments and various aspects of the present disclosure are illustrated in the following detailed description and the accompanying figures. Various features shown in the figures are not drawn to scale.

DETAILED DESCRIPTION

Figure 1:
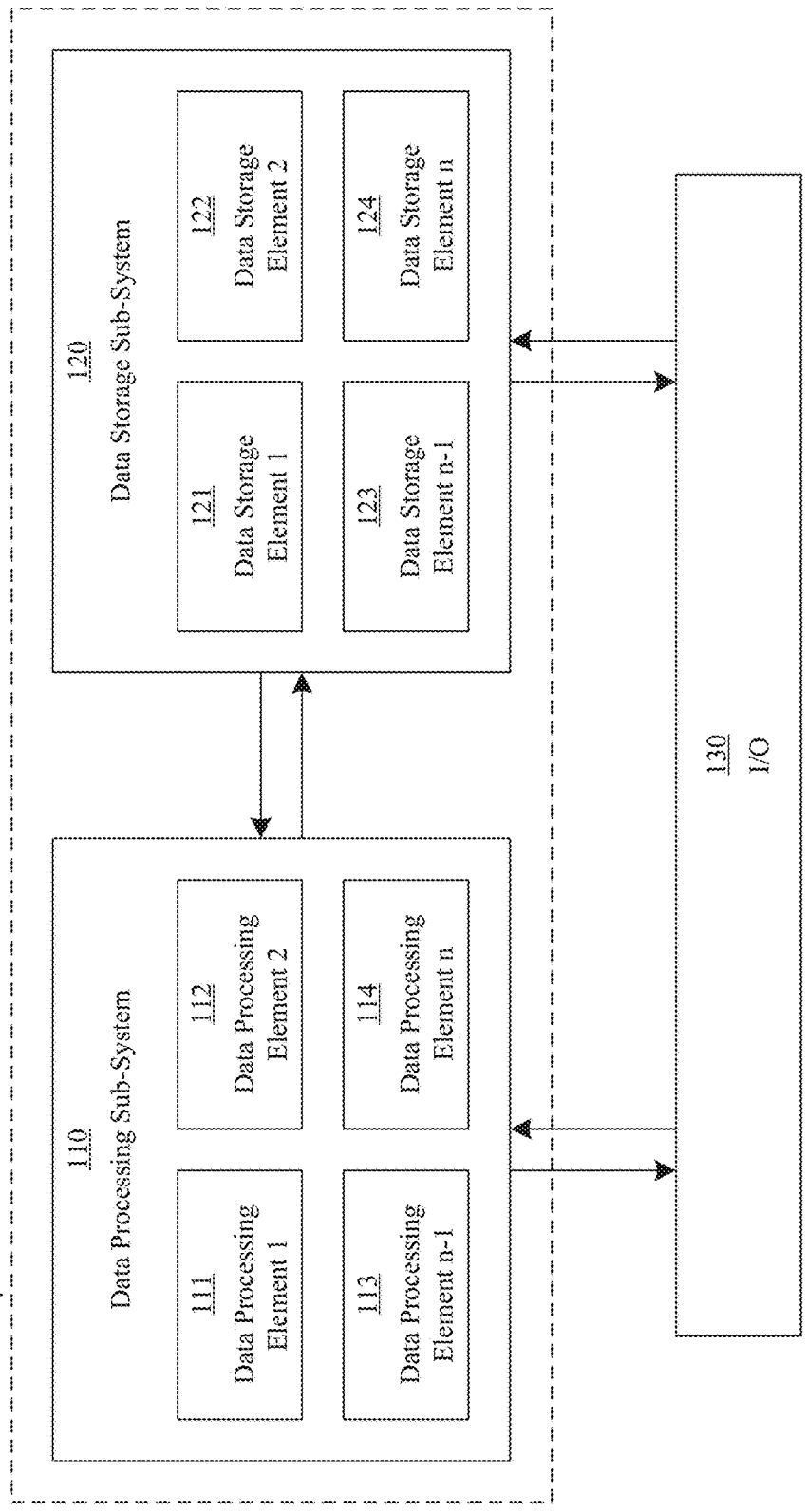
FIG. 1 is a simplified diagram illustrating a general Von Neumann architecture.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims. Particular aspects of the present disclosure are described in greater detail below. The terms and definitions provided herein control, if in conflict with terms and/or definitions incorporated by reference.

For most modern-day computers systems, the design, architecture and performance of the computer system's memory is of particular importance. Due to a variety of factors stemming from the physics of the materials used to implement most modern-day computing hardware (such as the use of silicon), the performance of a computer system's memory tends to be a bottleneck in the system's performance. For this reason, in most modern-day systems, a large amount of the systems resources (e.g., a significant proportion of the circuitry) are devoted to complex memory subsystems designed to reduce and ameliorate the impact of this memory bottleneck.

In large part, the significance of memory to a computer system's performance can be ascribed to the basic underlying architecture used by most modern-day computer systems. Of course, the use of this architecture is itself driven by various underlying physical constraints, which make it a (currently) better choice than alternative architectures, despite the potential performance bottlenecks it introduces.

To better understand why memory is often a bottleneck on many computer system's performance, it is useful to have an overview of their basic design. Starting from the very basics, a computer, in an abstract sense, can be thought of as a device capable of automatically carrying out a sequence of operations. These operations are primitive, meaning the computer system can carry them out without additional explanation; informally, the computer system understands these operations. Because of this requirement, primitive operations are usually (but not necessarily) relatively simple, leading most such operations to be some type of arithmetical or logic-based process (e.g., "add these two numbers together"). Of course, these operations can be combined together to achieve more complex results—this is essentially what a program is, i.e., a series of operations devoted to a particular task. Additionally, an operation almost always has an associated label, known as an instruction, which can be used to identify (and instruction the computer to perform) a particular operation.

This base definition of "computer" is a very broad definition, as this definition covers most system capable of automatically carrying out a sequence of operations, regardless of its construction or architecture (i.e., regardless of the implementation details). Because of this open-endedness, this definition allows for an enormous number of possible systems—and general system architectures—that could be used to make a "computer." Much of this variation concerns what primitive operations are made available, how the instructions determining what operations are to be performed is handled, and how input and output to these operations is handled. For computer science and related fields, virtually any of these architectures may be used, though usually the simply, more easily worked with ones are chosen (e.g., a "Turing Machine"). However, to implement computers in physical reality, one must contend with various constraints imposed by physics, particularly the properties of the materials available to be used. Ultimately, based on a variety of factors, the architecture found most suitable by most modern-day computer systems is the Von Neumann architecture or variants based thereon.

Conceptually, a computer based on the Von Neumann architecture can be thought of as two interacting sub-systems: a data processing sub-system and a data storage sub-system. As suggested by its name, the data processing sub-system is responsible for performing the various (primitive) operations of the computer system. The data processing sub-system is essentially tasked with carrying out the actual computation performed by the computer-system. On the other hand, the data storage sub-system is responsible for storing the programs (and thus the instructions making up the program) used to direct the data processing sub-system. Additionally, the data storage sub-system is also responsible for storing the various data used as input to (or resulting as output from) the various operations performed by the data processing sub-system. This data can be included at the very initialization/start of the program (e.g., before or as the data processing sub-system starts performing the operation indicated by the first instruction of the program) or the data may originate as the stored output of some previous operation performed by the data processing sub-system.

Modern-day computer systems generally employ generalized variants of the Von Neumann architecture. In these generalized variants, the data processing sub-system can contain a variety of data processing elements. Similarly, in the generalized Von Neumann architecture, the data storage sub-system can contain a variety of data storage elements. In general, the data processing sub-system includes a core element known as the central processing unit (CPU). Broadly speaking, the CPU is capable of handling a wide variety of tasks adequately (e.g., a CPU has a wide variety of primitive operations available). The CPU is also usually responsible for managing and coordinating the activities of the other data processing elements. These other data processing elements are usually heterogenous. That is, the data processing elements have different performance characteristics and having differing performance dependent upon the particular workload. These additional data processing elements are referred to as accelerators, and they are typically specialized for increased performance on specific operations and workloads, usually at the cost of decreased performance on other workloads.

Similarly, the data storage sub-system generally contains a core element known as the primary storage unit (PSU). In general, the PSU is directly accessible by the data processing sub-system (e.g., the CPU) and is tasked with storing the instructions and data used by the data processing sub-system. Broadly speaking, the PSU is optimized for speed, meaning that the PSU can rapidly handle transferring data to and from the CPU (and data processing elements, generally). As a tradeoff, however, the PSU typically has low storage density, high storage cost, and is volatile, meaning the PSU does not retain data if it loses power. For this reason, the data storage system also usually employs heterogenous data storage elements. That is, the data processing elements have different performance characteristics and having differing performance dependent upon the particular workload. These additional data processing elements are referred to as data storage devices, and they are typically specialized for increased data storage and non-volatility, usually at the cost of decreased speed and increased latency.

FIG. 1 is a simplified diagram illustrating the general Von Neumann architecture just described. According to FIG. 1, Von Neumann architecture 100 is composed of a data processing sub-system 110 and a data storage sub-system 120. Also present is I/O 130, which can provide input and output to data processing sub-system 110 and data storage sub-system 120. As further shown in FIG. 1, data processing sub-system 110 is composed of a variety of data processing elements, shown here as data processing elements 111, 112, 113, and 114. Similarly, data storage sub-system is also composed of a variety of data storage elements, shown here as data storage 121, 122, 123, and 124. As shown by the arrows, data processing sub-system 110 and data storage sub-system 120 may communicate and transfer data between one another.

In the basic version of the Von Neumann architecture, the data processing sub-system is composed only of the CPU and the data storage sub-system is composed only of the PSU. In general, the PSU is directly accessible by the data processing sub-system (e.g., the CPU) and is tasked with storing the instructions and data used by the data processing sub-system. In operation, the data processing sub-system and the data storage sub-system are tightly intertwined, particularly the CPU and PSU. To operate, the CPU must generally retrieve (data representing) the next instruction indicating the next operation to be performed by the CPU from the PSU. This instruction (more precisely, the operation the instruction indicates) may then trigger interactions with yet more data on the PSU (e.g., retrieving input for an arithmetic/logic operation, storing the output of an arithmetic/logic operation, etc.).

Figure 2:
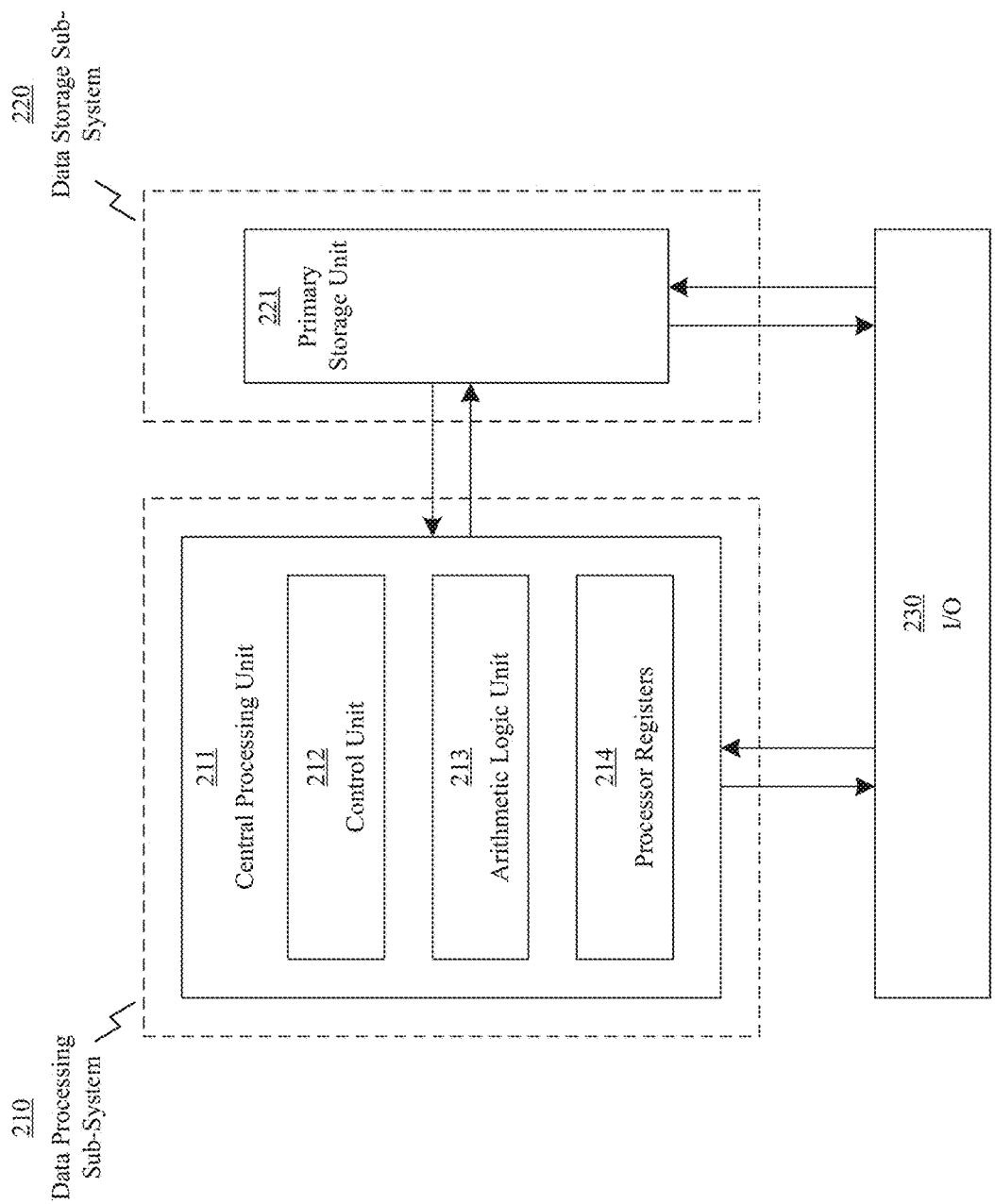
FIG. 2 is a simplified diagram illustrating a basic Von Neumann architecture.

FIG. 2 is a simplified diagram illustrating the basic Von Neumann architecture just described. According to FIG. 2, the basic Von Neumann architecture is composed of a data processing sub-system 210 and a data storage sub-system 220. As shown by the figure data processing sub-system 210 is composed of only one data processing element—central processing unit 211. Similarly, data storage sub-system 220 is also composed of only one data storage element—primary storage unit 221. Also present is I/O 230, which can provide input and output to CPU 211 and primary storage unit 221. Also shown in FIG. 2, are some of the internal components of CPU 211, including control unit 212, arithmetic logic unit 213, and processor registers 214.

The frequent necessity of communication makes the speed at which the data processing sub-system can respond or react to interactions by the data processing sub-system a potential bottleneck in the entire computer system's performance. This bottleneck is referred to as the "Von Neumann bottleneck." Unfortunately, in most modern-day computer systems the Von Neumann bottleneck is a significant problem. For various reasons, the speed at which the processing sub-system—particularly the CPU—operates/interacts with the memory sub-system has increased at a significantly faster rate than the memory sub-system—particular the PSU—operates/responds to the processing sub-system. This trend is sometimes referred to as the "memory wall" or "bandwidth wall." Because of this speed disparity, most modern-day computer systems employ a variety of strategies to reduce or mitigate the impact of the Von Neumann bottleneck and memory wall.

To understand some of the other strategies employed, it is useful to have a more detailed understanding of how the data processing sub-system interacts with the data storage sub-system, with particular attention to how the CPU interacts with the PSU. In turn, to understand how the CPU interacts with the PSU, it is useful to understand some of the internal design and architecture of most CPUs (which also applies to most other data processing elements) and most PSUs. To start, as a general matter, most modern-day computers are based on binary logic. This means that virtually all data in the computer is stored/represented as a series of bits (a unit of information which can only be one of two symbols, which are usually represented as "0" and "1"). Each discrete collection of bits can be interpreted as a binary number (e.g., a number in base-2, such as 0b0001101110001111 (where "0b indicates the number is in base-2), which is 7055 in base-10). For better human readability, binary numbers are often written as hexadecimal numbers (i.e., base-16) (e.g., the previous binary number 0b0001101110001111 is 0x1B8F, where "0x" indicates the number is in base-16).

As for the data storage sub-system, most PSUs consist of multiple fundamental units known as "memory locations." Each memory location refers to a discrete set of data, each usually of the same, fixed length/size. A memory location can be uniquely identified and addressed by an identifier associated with memory location known as a "physical address." The "first" physical address is typically numbered starting at 0x00000000 and continuing to increment by 1 for every sequential unit (e.g., for 32-bit addresses, 0x00000001, 0x00000002, 0x00000003, 0xFC4A95E3, etc., and for 64-bit addresses 0x0000000000000001, 0x0000000000000002, 0x000009BCFC4A95E3, etc.). Since most modern-day computers are based on binary data, the size of a memory location of most PSUs is some multiple of bits (note that a memory location can be composed of smaller units, called "memory cells," which usually store the value of a single bit; memory cells are usually not directly accessible, however). For most modern-day systems, the size of a memory location is 8 bits, which is also referred to as a byte. This memory design is referred to as "byte-addressable." Similarly, because most modern-day computers use binary numbers to represent data, the physical address is also usually a binary number of a fixed number of bits, which, for convenience, are usually also a fixed number of bytes (e.g., 16-bit (2-byte) physical address, 32-bit (4-byte) physical address, 64-bit (8-byte) physical address). Discrete blocks of data that are larger than a single byte made be stored in a sequence of consecutive addresses. Note that, while all data stored on most PSUs is stored as a binary number, the interpretation of what this data represents (e.g., its data type, such as a string, floating point number, etc.) may vary based on the program/instruction being executed or the operation being performed.

As for the data processing sub-system, CPUs (and most data processing elements) have a set of—usually basic—operations/actions they can perform. Each of these operations/actions is represented and identified by an instruction, which, because of the binary nature of computers, is usually represented by a binary number. The design of the entire set of instructions used by the CPU (and the operations/actions the instructions represent) is referred to as the instruction set architecture. At a high-level, the instruction set architecture of most modern-day systems divides instructions into two broad categories: memory operations and arithmetic/logic operations. This is generally referred to as a load-store architecture. The reason for this separation is that, most CPUs (and most data processing elements generally) cannot directly use data stored in a PSU in (e.g., as input to) an arithmetic operation (nor can most CPUs directly use the output of an arithmetic operation to store data on the PSU). Rather, to use data on the PSU, that data must first be transferred/stored in one of the CPU's processor registers. A processor register is a small memory-holding area used to hold data that is being used (or generated by) the CPU. The processor registers are usually of a fixed-size referred to as a word. The word is, similar to the physical addresses of the PSU, a certain number of bits, which for convenience is also usually a number of bytes (e.g., 16-bit (2-byte) word size, 32-bit (4-byte) word size, 64-bit (8-byte) word size). Only data located in these processor registers may be used as input to an arithmetic/logic operation and only data located in these registers may be stored on the PSU.

In a CPU using a load-store architecture, to transfer (e.g., copy) data into one of the CPU's processor registers, the CPU must be instructed to read data from the PSU and copy the data into a processor register. The CPU reads particular data and copy the data into a particular register using a memory operation (and is instructed to do so using the corresponding instruction). Similarly, the CPU is instructed to write particular data in a register to the PSU using a different memory operation (represented by a different corresponding instruction). Thus, to perform an arithmetic/logic operation using two different data values, the CPU must usually retrieve the load instruction, retrieve the first input, retrieve the second load instruction, retrieve the second input, retrieve the third instruction, and perform the indicated operation using the two values just retrieved as input.

Figure 3:
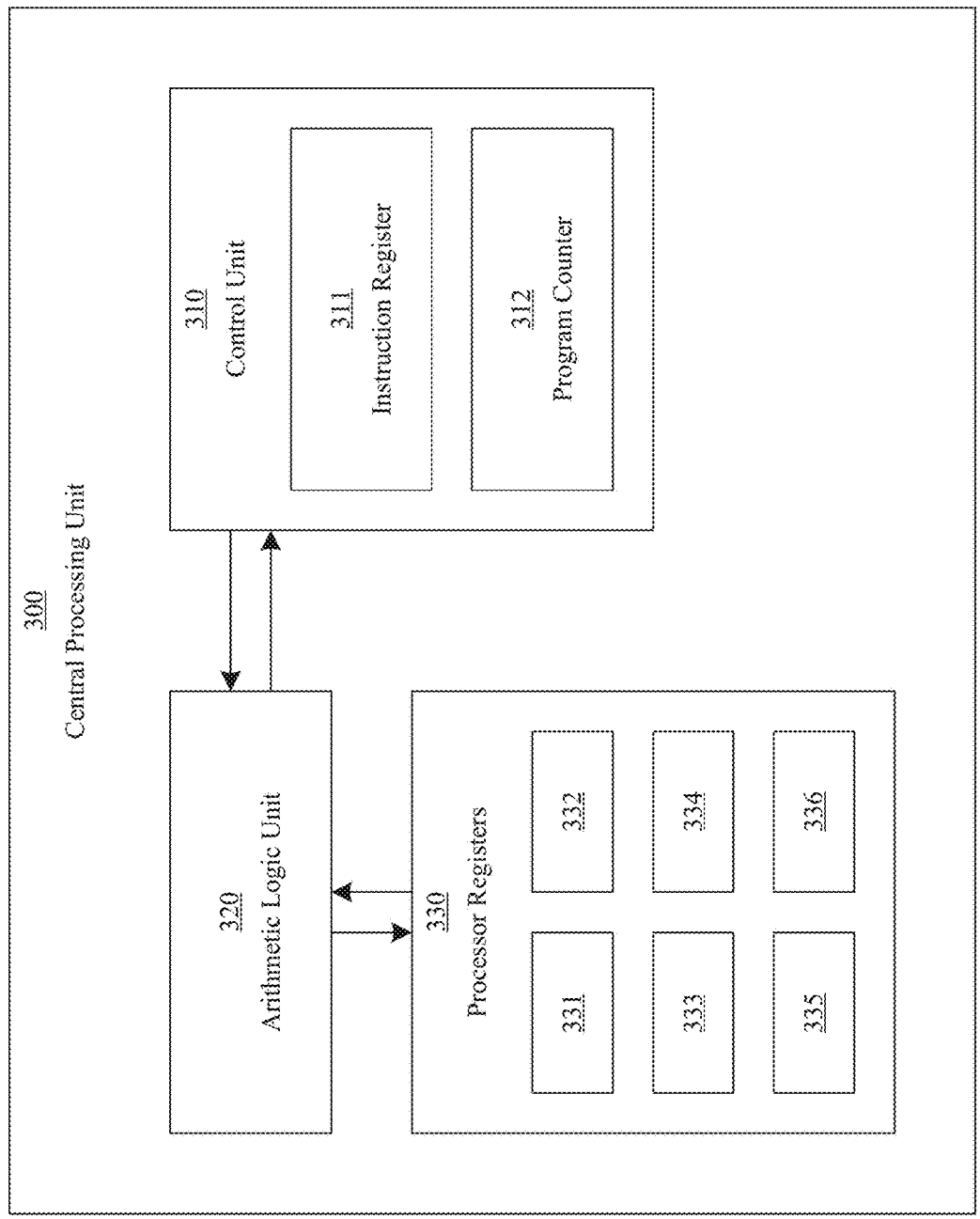
FIG. 3 is a simplified diagram illustrating the internal architecture of a CPU.

FIG. 3 is a simplified diagram illustrating the internal architecture of a CPU as just described. According to FIG. 3, the basic architecture of a CPU comprises a control unit 310, arithmetic logic unit 320, and processor registers 330. Control unit 310 contains instruction register 311 and program counter 312. Control unit 310 also has a connection to a PSU (not shown), from which control unit 310 can retrieve data and instructions. As discussed above, control unit 310 may retrieve instructions from a PSU and store these instructions in instruction register 311. Control unit 310 may also use program counter 312 to store the physical address where the next instruction to be executed is located on the PSU. As FIG. 3 also shows, control unit 310 is connected to arithmetic logic unit 320. Based on the instruction stored in instruction register 311, control unit 310 can configure arithmetic logic unit to perform various operations. Arithmetic logic unit 320 may perform these operations by altering the data stored in processor registers 330, shown here as processor registers 331, 332, 333, 334, 335, and 336.

Note that some systems use an instruction set architecture that is known as a register memory architecture. In these instruction sets, an arithmetic operation may specify data on the PSU, seemingly allowing data on a PSU to be manipulated by an arithmetical/logic operation (e.g., used as input or set by output) without first being copied to or from a processor register. However, in most of these systems, these instructions are actually implemented by a yet deeper, more fundamental layer of instructions—called the microcode—which divides the given instruction into several smaller, more fundamental microinstructions. The collections of microinstructions then perform the process just described above, i.e., input data is first retrieved and placed into a processor register before that data is used by the CPU. This means that the microcode instructions retrieves any input data—that is on the PSU and not currently in a processor register—from the PSU and places the retrieved input data into a processor register before performing the arithmetic/logic operation using that input. Similarly, this also means that the microcode instruction first places any output data resulting from performing the arithmetic/logic operation on a processor register before performing memory operations using that output.

Thus, at a high-level overview (of the basic Von Neumann architecture), the CPU of the data storage sub-system typically interacts with the PSU of the memory storage sub-system in a pattern of (1) retrieve instruction→(2) perform instruction→(3) retrieve instruction→(4) perform instruction→ . . . . In almost every case, the CPU retrieving its next instruction involves retrieving (data representing) the instruction from the PSU. Additionally, if the instruction retrieved is a memory operation, then the CPU will also interact with the PSU (e.g., to retrieve data from the PSU or to store/modify data on the PSU). Thus, the CPU constantly interacts with the PSU, both to determine its next operation (i.e., retrieve its next instruction) and, in many cases, to perform that operation.

Given the frequency with which the CPU interacts with the PSU (and, in general, the frequency with which the data processing sub-system interacts with the data-storage sub-system), reducing or ameliorating the effects of the Von Neuman bottleneck or memory wall—e.g., the tendency of the PSU to have insufficient speed compared to the CPU—is central consideration for the overall computer system's performance. Toward this goal, modern-day computer systems employ various strategies to reduce or mitigate the performance difference between the data processing sub-system and the data storage sub-system. One of the oldest and most basic strategies employed is to optimize the PSU to help reduce the speed disparity. It is for this reason that a PSU is usually optimized to have high speed and low latency.

One of the oldest and most basic strategies employed is to heavily optimize the main component of most data storage sub-systems—the PSU—to have high speed and low latency. While this helps reduce the performance gap between the data processing sub-system—or its main component, the CPU—and the data storage sub-system, having the PSU optimized for high speed results in various tradeoffs. For example, PSUs typically possess low storage density (e.g., low amount of data stored for each unit of volume) and typically possess high storage cost (e.g., high amount of cost for each unit of data storage). Most importantly, however, is that the optimization for high speed and low latency results in most PSUs being volatile, meaning that PSUs do not retain data if power is lost.

In a technical sense, having non-volatile storage is not strictly necessary for a computer system. Given some way to externally load the necessary data—e.g., a program to be executed—and some way to retrieve any desired output—e.g., the result of that program—only a means to store and retain data during execution is needed for a computer system to function. This functionality is exactly what a PSU provides. This is analogous to human "working memory," which is the neurological system responsible for retaining/remembering information for tasks currently being worked on. However, while not strictly necessary, most modern-day computer system find the ability to store data on a long-term basis beneficial.

Thus, because possessing non-volatile storage is usually beneficial, most data storage sub-systems also employ an additional component known as a secondary storage unit (SSU). Much like a PSU is analogous to human "working memory," an SSU is analogous to human "long-term memory," which is the neurological system responsible for retaining/remembering memories and information not currently being used, usually on a long-term (and potentially permanent) basis. Given its role in the data storage sub-system, unlike a PSU, an SSU is usually optimized for high storage capacity and long-term data retention, including non-volatility. As a consequence, however, an SSU is often slower than a PSU, both in terms of bandwidth (the amount of data able to be transferred over a time interval) and in terms of latency (the time taken to being responding to an I/O request).

Thus, in most computer systems, the data storage sub-system has both a PSU and an SSU, with the PSU serving as a high-speed repository for data relevant to the process/task being carried out by the CPU (or other data processing element of the data processing sub-system) and the SSU serving as a slower-speed repository for data and information not currently relevant to any ongoing process/tasks being executed. However, because the SSUs reduced performance (e.g., slower speed and higher latency) creates an even larger speed differential between the SSU and the CPU (or other data processing element), most computer systems do not transfer data directly from an SSU to the data processing sub-system.

While a direct exchange between a CPU and SSU is not theoretically impossible, most computer systems are architected so that, for a CPU (or other element of the data processing sub-system) to access data stored on an SSU, the data on the SSU must be first transferred to a PSU before then transferring that data to the data processing sub-system. As may be apparent, the reason for this data storage hierarchy is to avoid the data processing sub-system (e.g., a CPU) from spending, and wasting, a large number of its computing time (e.g., clock cycles) idling while data is retrieved from an SSU. Instead, the data is first read to the PSU while the data processing sub-system handles other tasks. Sometime after the transfer to the PSU is accomplished, the data processing sub-system may then retrieve the data (and handle the associated task) from the much faster PSU, avoiding a large waste in computing time.

Figure 4:
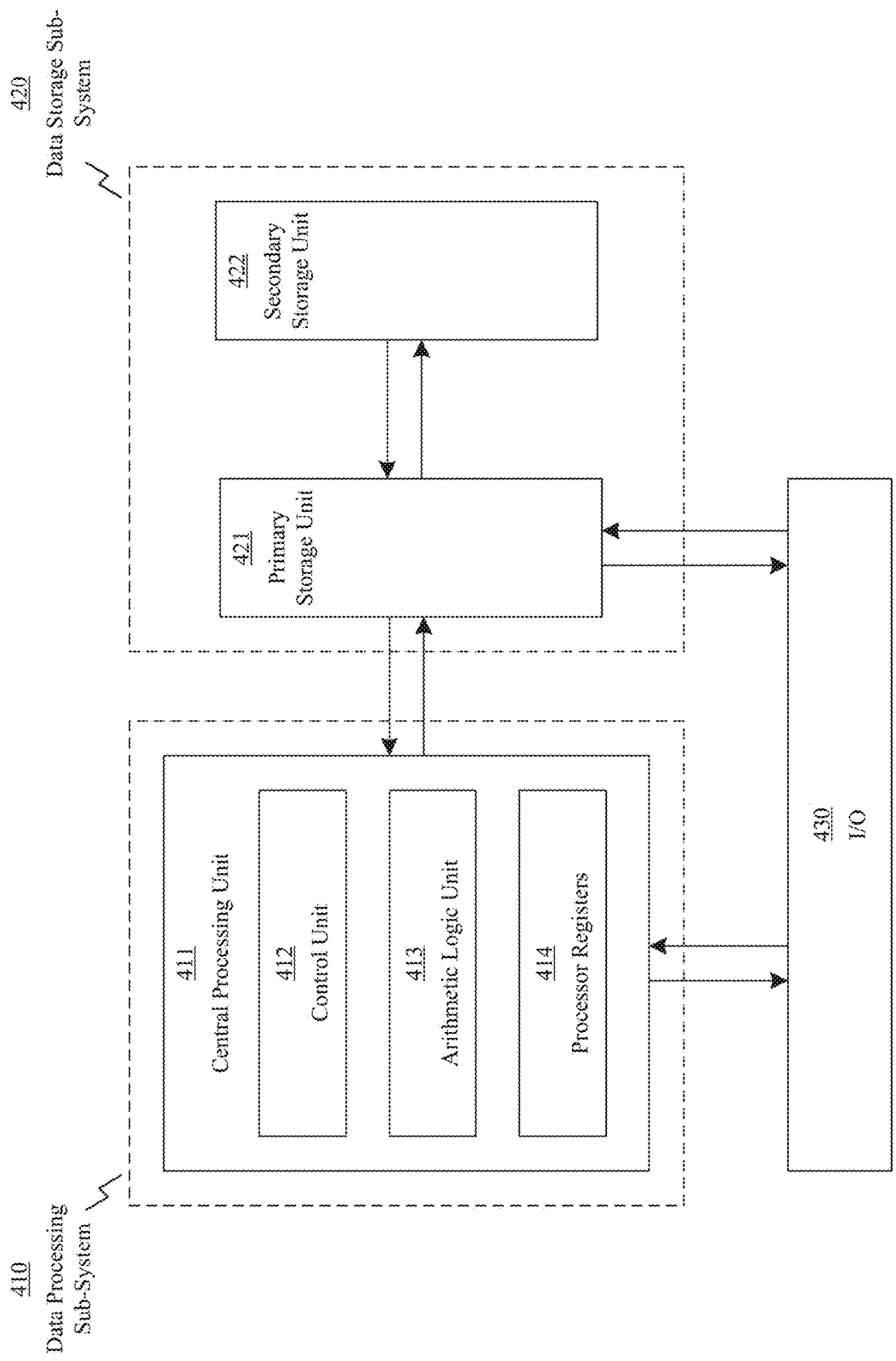
FIG. 4 is a simplified diagram illustrating a Von Neumann architecture variant.

FIG. 4 is a simplified diagram illustrating the Von Neumann architecture variant as just described. According to FIG. 4, the architecture is composed of a data processing sub-system 410 and a data storage sub-system 420. As shown by the figure data processing sub-system 410 is composed of only one data processing element—central processing unit 411. In contrast, data storage sub-system 420 is also composed of two data storage elements—primary storage unit 421 and secondary storage unit 422. Also present is I/O 430, which can provide input and output to CPU 411 and primary storage unit 421. Also shown in FIG. 4, are some of the internal components of CPU 411, including control unit 412, arithmetic logic unit 413, and processor registers 414. Also illustrated are the connections between central processing unit 411 and primary storage unit 421. As shown by these connections, data may be transferred between central processing unit 411 and primary storage unit 421. In a similar manner, the connections between primary storage unit 421 and secondary storage unit 422 are shown.

Of course, modern-day computer systems employ multiple additional strategies to ameliorate the Von Neumann bottleneck beyond merely optimizing the speed of the PSU. In many cases, the strategies simultaneously also deal with other issues imposed on the computer system physical constraints. This is notable because, in dealing with these other constraints, sometimes tradeoffs against further ameliorating the Von Neumann bottleneck are made.

One of these additional complexities on real-life computer systems is the inclusion of an operating system (OS). An operating system may be thought of as the "central" or "master" program that manages a computer system's hardware and various low-level operations. At a high level, one of the chief benefits of an operating system is that an operating system allows other programs/applications to safely ignore (i.e., abstracts away) the various underlying details of the computer system (and of other applications that are potentially running concurrently). As part of this abstraction, the operating system typically manages the operation of the data storage sub-system, a task that is known as "memory management." One of the most useful and widespread aspects of memory management employed by operating systems is the use of "paged virtual memory."

Figure 5:
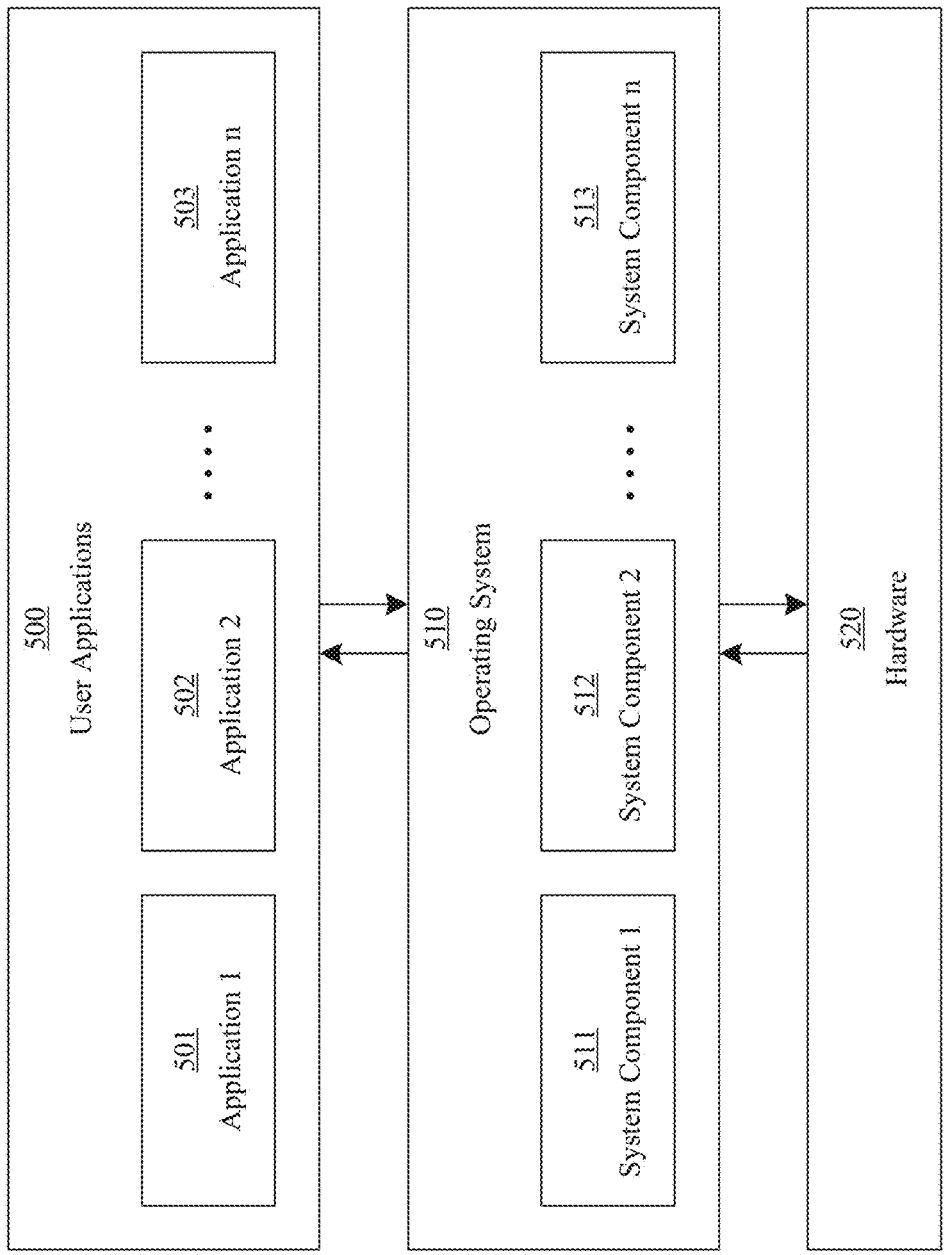
FIG. 5 is a simplified diagram illustrating the structure of an operating system.

FIG. 5 is a simplified diagram illustrating the structure of an operating system as just described. According to FIG. 5, a computer system may be composed of various hardware 520, which can have operating system 510 executing thereon. Operating system 510 may have various system components—shown here as system components 511, 512, and 513—which provide various functionality. An example of such a system component is memory management. Running on top of the OS are user applications 500, shown here as applications 501, 502, and 503. User applications 500 may take advantage of the various features and services offered by operating system 510 through system components to 511, 512, and 513 to interface with hardware 520 in a simplified manner.

As background, most modern-day computer systems provide the ability to allow multiple programs to be executed concurrently. This feature is usually implemented by the OS, where, instead of being called concurrent execution, it is more typically called multitasking. Multitasking can be achieved by interleaving the execution of various programs, allowing each a certain amount of time to operate. This process is called "time-sharing." Multitasking can also be achieved by utilizing a CPU (or other data processing element) with multiple cores by allowing different programs to be executed on different cores. In either scenario, allowing multiple programs to simultaneously be mid-execution creates potential conflicts regarding their memory usage. Specifically, as mentioned above, a program uses various memory addresses (and the memory locations the represent) to store its data. A conflict can arise, however, when two programs attempt to use the same physical address space. Such a conflict is particularly likely, in fact, because most programs use the address space starting at 0x00000000 up to the total amount of memory used by the application. This can lead to programs overwriting or otherwise altering one another's data. Beyond data corruption, this often leads to erroneous results (e.g., if the altered value is used as input for other operations), and, usually, failure of the program whose data was altered (e.g., a crash).

Paged virtual memory addresses these problems by acting as a means for the OS to transparently (to the programs) coordinate the memory being used by any programs being executed. This essentially abstracts away the details of coordinating memory usage (from the program's perspective), allowing a program to be written without concern for what other programs it may be ran concurrently with. In particular, paged virtual memory is a combination of two related memory management techniques: paged memory and virtual memory.

In a computer system utilizing virtual memory, the OS assigns to each program a virtual address space. From the perspective of the program, the "virtual address space" is the same as a "physical address space." However, because each program is assigned its own virtual address space, the program can freely use any virtual memory address without concern for the memory usage of any other concurrently executed programs. To actually implement each program's virtual address space, the OS can assign a (sufficiently sized) portion of the physical address space and create a data structure that records a mapping between a program's virtual memory addresses and a corresponding physical memory address from the assigned physical address space. This data structure can then be used to map the program's virtual addresses to their corresponding physical addresses. By ensuring that portions of the physical address space are mapped only to one program's virtual address space, the OS can ensure that no two programs attempt to use the same physical address, avoiding the memory coordination problem of concurrently executing multiple programs. Virtual addressing is usually given hardware assistance by the CPU through its memory management unit (MMU). The MMU primary performs translation of virtual memory addresses to physical addresses, speeding up the process.

But "virtual memory" suffers from several inefficiencies. First, without some kind of memory segmentation scheme (like paging), the physical address space assigned to a programs virtual address space must be contiguous. This leads to problems of memory fragmentation, reducing the effective amount of available memory on a PSU. Second, in some versions of virtual memory, each program being executed must have a physical address space assigned until the program has finished being executed. Given the limited capacity of a PSU, this can quickly exhaust the available amount of a PSU's memory, leaving insufficient memory to execute additional programs. Paging is a segmentation scheme that can be applied to virtual memory to avoid this first problem. Paging also naturally lends itself to yet another variant called demand paging, which helps resolve the second problem.

In particular, paging—or paged virtual memory—involves dividing each program's virtual memory into equal sized segments, called pages (or, sometimes, "virtual pages"), with the typical size being 4 kb. The system's physical memory is similarly divided into equal sized blocks, called page frames (or, sometimes, "physical pages). For efficiency, the size of a page frame is typically the same size as a page (though, occasionally, the page frame size is smaller or larger by some power of 2). Then, rather than mapping a program's entire virtual address space to some (contiguous) physical address space, each page of a program's virtual memory is mapped to a page frame of physical memory. The OS maintains a data structure known as a page table that records what physical frame each page is mapped to. While this version of paging avoids the fragmentation problem of having to map a program's virtual memory to a contiguous segment of physical memory, it doesn't resolve the problem of having to map all of a program's virtual memory to physical memory, regardless of whether all of the program's virtual memory is currently being used. However, a variant of paging known as demand paging, does resolve this problem.

Figure 6:
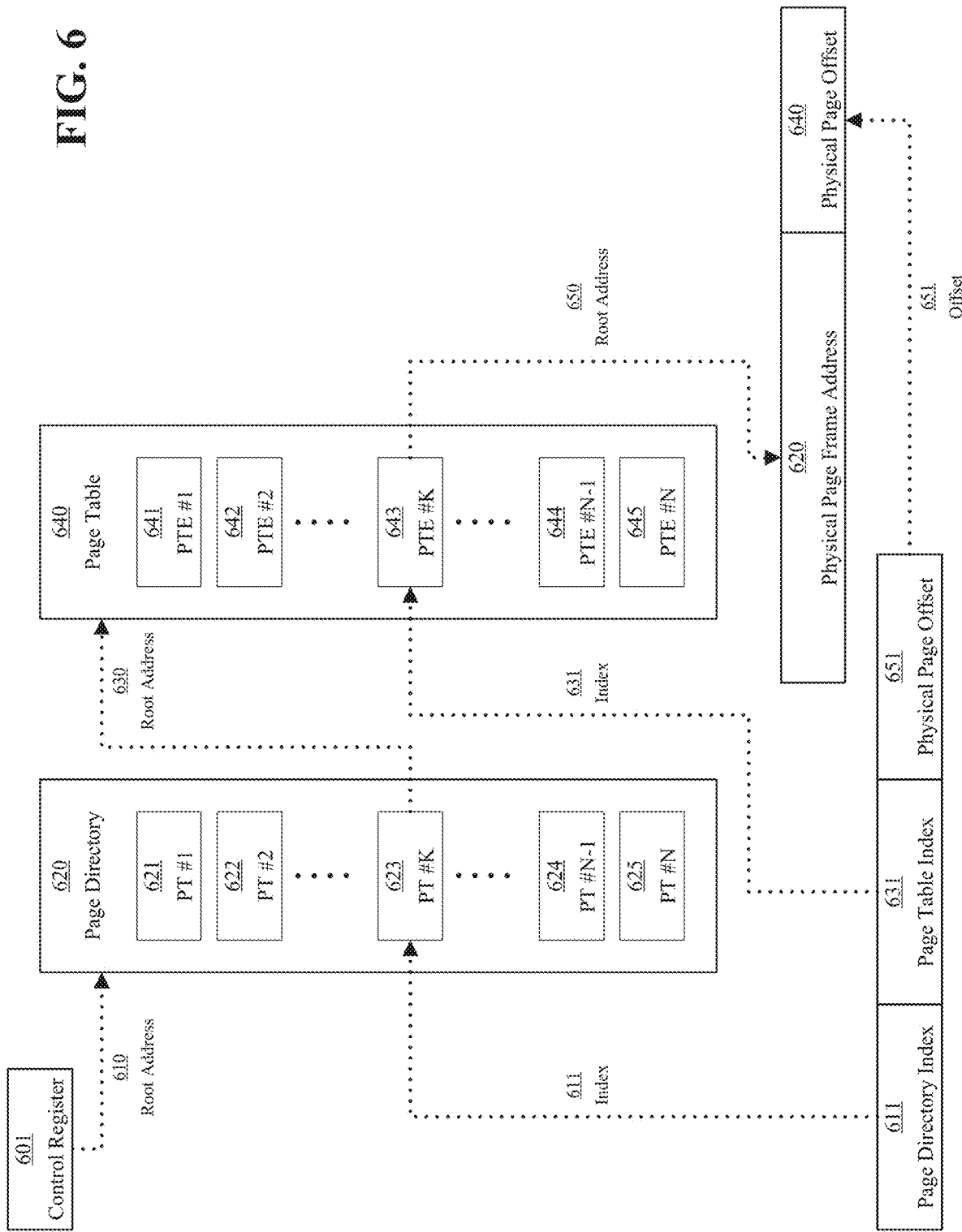
FIG. 6 is a diagram illustrating how virtual addresses are mapped to physical addresses in a virtual paging system utilizing page tables.

FIG. 6 is a diagram illustrating how virtual addresses are mapped to physical addresses in a virtual paging system utilizing page tables. In particular, FIG. 6 shows a two-level page table that maps virtual addresses to physical addresses. To start, in every page table system, control register 601 contains the physical address of the beginning of the highest-level table. In a two-level page table scheme, the highest-level table is the page directory. Every entry in a page directory is the physical address of the beginning of a page table, which is the next (and lowest level) table. Every entry in a page table is the address to a physical frame that actually stores the desired data. In operation, a virtual address (the combination of page directory index 611, page table index 631, and physical page offset 651) in a two-level page table scheme is divided into three components: The first component (directory index 611) is an index for the appropriate page table in page directory 620 and the second component (page table index 631) is an index for the appropriate physical frame address in page table 640. The third component is simply the offset into the physical frame and is not mapped. Rather, the third component is appended to the physical frame address to determine the complete physical address that the virtual address maps to.

Demand paging is essentially the same as paging/paged virtual memory, except that demand paging exploits the existence of the SSU. In demand paging, only some of a program's pages are assigned to (backed by/stored on) a page frame, usually the ones that are in active use. For the pages not backed by a page frame, the unbacked pages are instead stored (swapped out) to the SSU. The portion of the SSU used for this purpose is typically called the swap space. This allows the OS/computer system to assign more virtual memory than could fit on the physical memory at one time, because the OS can freely swap out which page is being backed by a page frame at any given time. By analogy, one can think of pages stored on an SSU as being somewhat analogous to the concept of a human's "intermediate-term memory." Typically, an SSU is used to store data for long-term retention, without most of the data not being presently used at any given time. This is analogous to a human's "long-term memory." The portion of the SSU used for the swap space, however, is usually not intended for long-term retention. Rather, data stored in the swap space is data that is in presently being used, but, only in the intermediate future (e.g., minutes), rather than at the literal present moment or short-term future (e.g., seconds). This is analogous to human short intermediate-term memory, which stores information that, while relevant to the current task, is not being used for the actions being performed at the exact literal moment.

Because demand paging involves having some pages stored on the PSU while having other pages stored on the SSU, the OS should have some method of determining which pages should be on the PSU and which should be on the SSU. There is the initial questions of—at the start of an application—what pages should be brought to the PSU at initialization. Thereafter, while the application is running, there is the two separate but interrelated questions of when to transfer additional pages from the SSU to the PSU (page in) and when to transfer (if ever) pages from the PSU back to the SSU (page out).

Since a page usually must reside in the PSU for its instructions to be executed by the CPU (or its data to be accessed), a program (at the start of its execution) must have at least one page in the PSU. Thereafter, at a minimum, new pages may be paged in as the new pages are referenced. More precisely, a reference to a page (more precisely, whenever a virtual address on a page) that is not currently paged in (e.g., is currently swapped out to the SSU) is referenced/accessed is referred to as a page fault. Whenever a page fault occurs, the OS intervenes to page in the referenced page (i.e., load the referenced page onto the PSU from the SSU). Variants of demand paging may also choose to load other, non-referenced pages (called prefetching) or may load pages without the occurrence of a page fault. Almost every OS also does the inverse operation, i.e., paging out a page currently paged in (e.g., currently loaded onto the PSU) to the swap space in the SSU. The criteria used to determine which page is selected to be paged out is referred to as the page-replacement algorithm, with various algorithms using various criteria. While paging out is not theoretically required, the problem that demand paging was introduced to solve—ensuring that free space remains in the PSU—could reoccur (e.g., all available physical memory—every page frame—could eventually be in use). This could lead to memory running out, which could cause problems if a program attempts to access a page that was currently paged out.

The basic variant of demand paging is "pure demand paging," which only ever pages in a page upon the occurrent of a page fault. While this does resolve the problem of having a limited amount of physical memory available on a PSU, purge demand paging introduces another problem by compounding the effect of the memory bottleneck. Specifically, since a page is only ever loaded in when a page fault occurs, whenever a page is first accessed, the OS usually intervenes to load the referenced page onto the SSU. Since pages are relatively small, this is likely to happen very frequently. This is problematic, however, because of the vast speed disparity between the SSU and data-processing subsystem elements, such as the CPU. When a page fault occurs, the CPU usually has to wait a significant amount of time (relative the time taken per clock cycle) for the relevant page to be retrieved from the SSU onto a (just mapped) page frame in the PSU. To help reduce the occurrence of page faults, many OS's utilize a variant demand paging known as anticipatory paging (as opposed to pure demand paging).

In anticipatory paging, as suggested by its name, the OS attempts to predict what pages a process will soon access or reference (i.e., the OS attempts to predict what virtual memory addresses the process will attempt to interact with in the near-term future) and then preloads—e.g., prefetches—the pages predicted to be soon accessed before the access occurs so that, by the time the access occurs, the page has already been mapped to a page frame and had its data loaded onto the corresponding memory locations of the PSU. Unfortunately, however, it is impossible to always perfectly know in advance what page (or, more specifically, what virtual addresses) a process will attempt to reference (at least, not without running a complete simulation of the program, which would be redundant). Therefore, every implementation of anticipatory paging uses heuristics to guess what pages (more specifically, what virtual addresses) will be referenced in the near future, and then preloading those pages (more specifically, the pages containing the virtual addresses). Heuristics are similarly used by page replacement algorithms to guess what pages will not be referenced in the near future, and then paging out those pages.

The heuristics used by many variants of anticipatory paging are based on locality of reference. Locality of reference refers to the tendency of (a particular instruction in) a program to repetitively refer to nearby memory locations over a short time span. This, in turn, means that a reference to (a virtual address of) one page indicates that references to (virtual addresses of) nearby pages are likely. This can be exploited in anticipatory paging schemes by, upon occurrence of a page fault, paging in the pages neighboring the page-fault-triggering page's neighboring pages (if the neighboring pages are paged out) along with the page-fault triggering page, since the neighbors are also likely to be accessed in the near future. Usually, these functions are also given hardware support by a CPU's MMU.

While the paged virtual memory systems just described help ameliorate some of the performance reductions caused Von Neumann bottleneck, many, if not most, of the performance reductions still persist. For this reason, most modern-day computer systems employ an additional strategy to further reduce the performance penalty: caching. More specifically, virtually all modern day components of the data processing sub-system, particularly the CPU, employ internal memory known as hardware caches. A hardware cache functions much like a higher tier of memory above the PSU but below the internal processor registers. More specifically, a hardware cache is typically faster than the PSU (like the PSU is faster than the SSU), but also smaller, in terms of storage capacity, than the PSU (like the PSU has less storage capacity than the SSU). A hardware cache functions in many ways like the PSU, except that a hardware cache only stores copies of data on the PSU for convenience. In other words, a cache is used to hold copies of frequently accessed data, so that the data can be accessed faster than the data could be retrieved from the PSU. If the data is modified, the data may be retained in the cache (if the data is still being used and or modified) before being written back to the PSU (so that, in effect, the cache holds the current copy of the data).

The interaction between a hardware cache and PSU is also similar to the interaction between a PSU and SSU in that the CPU (or other data element) containing the hardware cache determines what data to retain in the hardware cache and also determines what retained data to remove (or write back, if change were made that are intended to be but have not yet been written to the PSU). This is largely analogous to the memory management functions performed by the operating system when deciding what pages to page in to the PSU and what pages to page out to the SSU. The criteria that determines when data is retrieved into the cache or evicted from the cache is called the cache algorithm. This situation is somewhat complicated by the fact that most modern CPUs (and most other modern data processing elements) have several layers of hardware caches (called multi-level caches), which forms a cache hierarchy. The hardware caches are typically labeled L1, L2, etc., with L1 being the hardware cache located closest to the processor register (i.e., located at the top of the cache hierarchy), L2 being the next closest, and so on. Multi-caches follow the same general trend of the memory hierarchy in that hardware caches closer to the processor registers (e.g., the L1 cache) are faster, but have smaller storage capacity while hardware caches closer to the PSU are slower but have a larger storage capacity. Data moves between different cache layers in much the same way as data is moved between the outermost cache and the PSU. Where hardware caches and PSUs differ, however, is that, rather than the OS being in charge of paging in and paging out data, the CPU (or other data storage element) is in charge of moving data (and determining what data to move) between the PSU and last-level cache or between the various levels of caches.

As mentioned earlier, most modern-day computer systems utilize a modified version of the basic Von-Neumann architecture. Rather than the data processing sub-system being composed of only the CPU, most modern-day computers also utilize other data processing elements. These other data processing elements, called accelerators, are more specialized than the CPU. Accelerators, unlike CPUs, utilize a specialized architecture that is more efficient (e.g., greater serial speed, more parallelism, less energy usage) for the particular tasks the accelerator is designed for. That is where the term "accelerator" comes from; an accelerator speeds up (i.e., accelerates) the workload or workloads the accelerator is designed for. As a cost for this speedup on one set of tasks, however, accelerators tend to do worse on other sets of tasks. One common example of such an accelerator is a GPU, which is faster than a CPU on tasks that require processing numerous simple operations, such as often occurs in machine learning applications.

Figure 7:
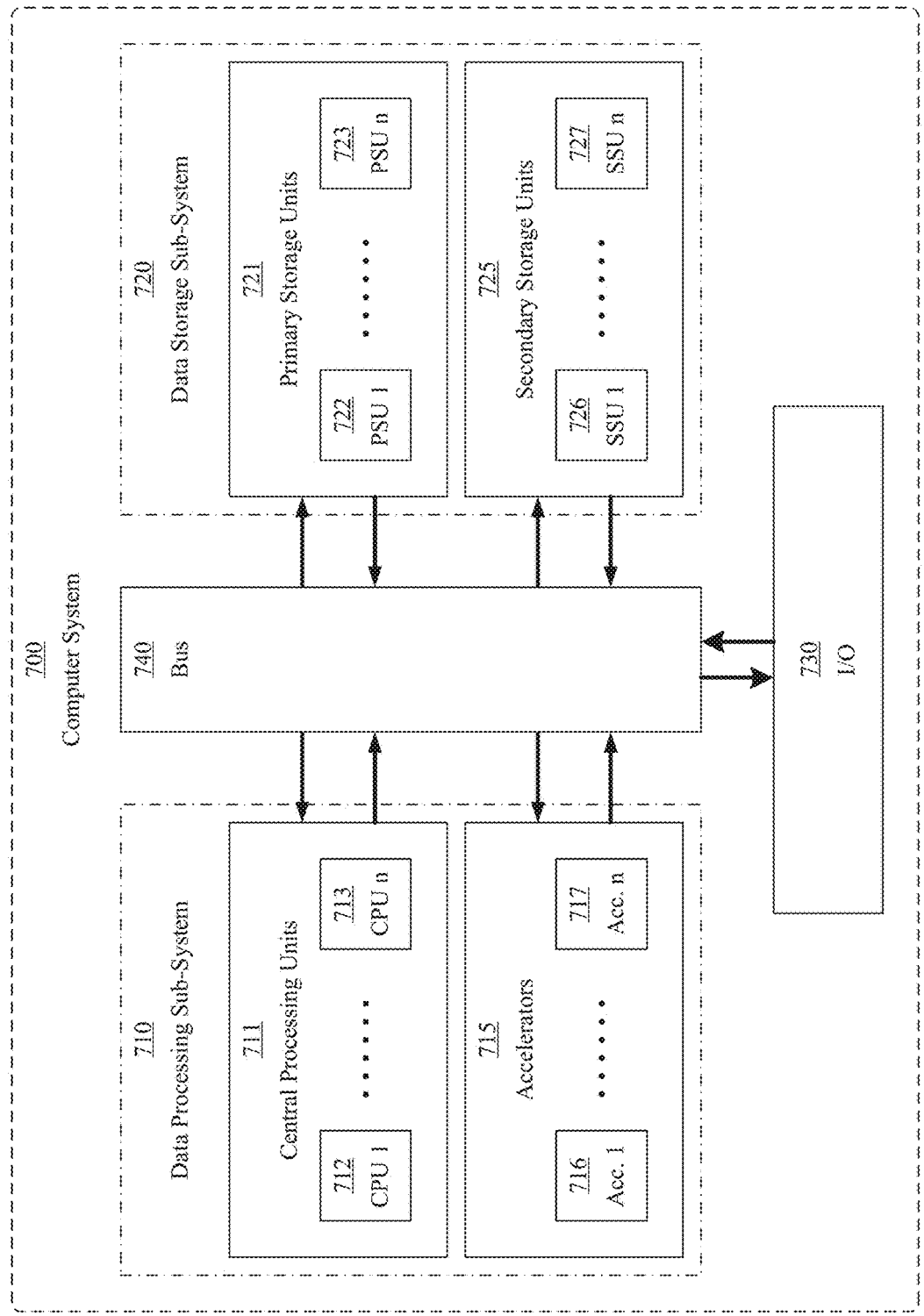
FIG. 7 is a simplified diagram illustrating the modified Von Neumann architecture employed by many modern-day computer systems.

FIG. 7 is a simplified diagram illustrating the modified Von Neumann architecture employed by many modern-day computer systems. According to FIG. 7, the architecture is composed of a data processing sub-system 710 and a data storage sub-system 720. As shown by the figure data processing sub-system 710 is composed of various data processing elements, including central processing units 711 and accelerators 715. As shown by the figure, data processing sub-system 710 may have multiple central processing units—shown here as CPUs 712 and 713—and multiple accelerators—shown here as accelerators 716 and 717. Similarly, data storage sub-system 420 is also composed of various data storage elements, including primary storage units 721 and secondary storage units 725. As shown by the figure, data storage sub-system 720 may have multiple primary storage units—shown here as primary storage units (PSUs) 722 and 723—and multiple secondary storage units—shown here as secondary storage units (SSUs) 726 and 727. Also shown is bus 740, which connects data processing sub-system 710 and data storage sub-system 720. Bus 740 may also connect the internal components of data processing sub-system 710 and data storage sub-system 720 together. Additionally, bus 740 may connection data processing sub-system 710 and data storage sub-system 720 to I/O 730, which can provide input and output to these sub-systems.

Figure 8:
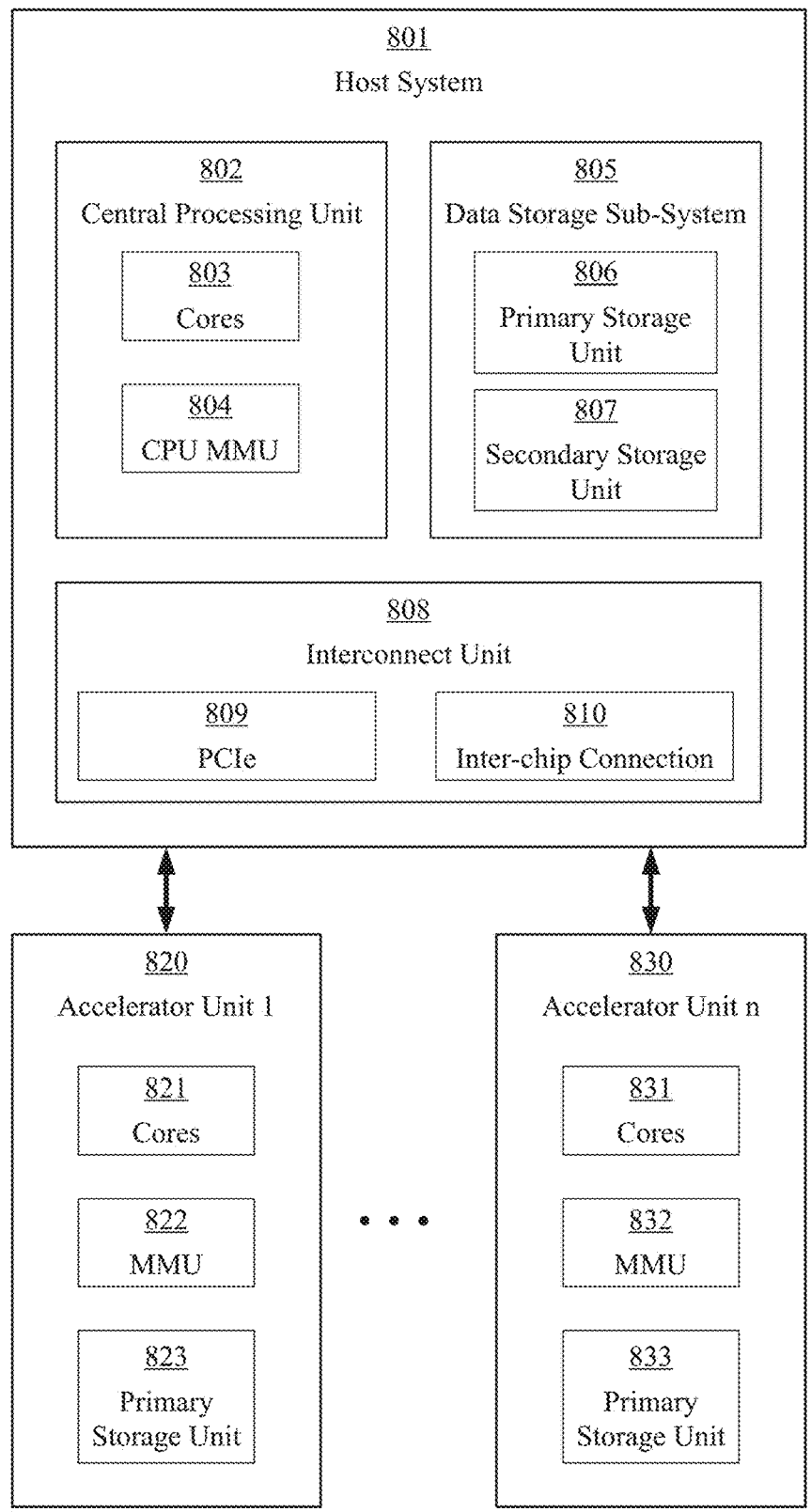
FIG. 8 is a simplified diagram also illustrating the architecture employed by many modern-day computer systems.

FIG. 8 is a simplified diagram also illustrating the architecture employed by many modern-day computer systems, particular heterogenous computer systems. According to FIG. 8, host system 801 may comprise a central processing unit 802, interconnect unit 808, and data storage sub-system 805. Central processing unit 802 may contain cores 803 and CPU MMU 804. Similarly, data storage sub-system 805 may contain primary storage unit 806 and secondary storage unit 807. CPU 802 may communicate with data storage sub-system 805 (and ultimately, may communicate with primary storage unit 806 and secondary storage unit 807) through interconnect unit 808. Host system 801 may also be connected to a plurality of accelerator units—shown here as accelerator units 820 and 830—through interconnect unit 807. Also shown by FIG. 8 is that an accelerator unit, such as accelerator 820, is comprised of cores (such as cores 821), an MMU (such as MMU 822), and a primary storage unit (such as primary storage unit 813).

Despite this difference, however, accelerators do share one particular relevant similarity with CPUs; accelerators still fetch instructions to be executed and data to be used from a PSU. In some computer systems, an accelerator may fetch instructions and data from a PSU into internal hardware caches in much the same was as a CPU does. This system introduces complications, however, as complex systems usually must be used to ensure data coherency. In other words, additional systems are used to ensure that an accelerator does not access data on a PSU that is being modified by another data processing element (e.g., a CPU or other accelerator), since this can result in race conditions or the use of stale and invalid data. Additionally, having accelerators share the PSU with the CPU can result in competition between the accelerator and CPU for storage space, possibly reducing the performance of the system.

As an alternative approach, in some computer systems, an accelerator may have its own internal PSU that is dedicated solely to the accelerator's use. In this approach, for the accelerator to fetch instructions or data, the instructions are first copied over from central PSU to the accelerator's PSU. In other words, an additional step is added, with the accelerator's internal PSU treating the central PSU in a similar manner the how the CPU treats the SSU. Note that, at this level of complexity, some systems may have scenarios where the accelerator can directly retrieve data from the central PSU or directly transfer data from an SSU onto its internal PSU. While this solves some of the issues identified above for a shared central PSU, giving an accelerator its own internal CPU introduces another inefficiency. Namely, in a basic implementation, the internal PSU for an accelerator is not transparent. Rather, the accelerator's internal PSU is exposed to programs using the accelerator, who must account for its use. Combined with the fact that the virtual memory addresses for a program running on the GPU are not coordinated with the virtual addresses for the same program running on the CPU, this means that zero copy operations are not possible.

To address this limitation, some computer systems employ systems to implement a unified memory, such as a heterogenous system architecture. This allows the virtual memory used on both the central PSU and on the accelerator's internal PSU to be coordinated, so that pointers may be freely shared between programs running on the accelerator and between programs running on the CPU (or other accelerator using the central PSU). In other words, unified memory allows a CPU and accelerator (e.g., GPU) to use the same virtual memory space (for a given program).

However, when using a system with unified memory, such as a heterogenous system architecture, for reasons of coherency, pages that are utilized by an accelerator may still have to be transferred to the accelerator's PSU. However, just like with the system PSU, an accelerator's PSU has limited space. Thus, pages are moved between the accelerator's PSU and the system PSU in much the same way that pages are moved between the system PSU and the SSU. This should be managed carefully, however, to avoid issues such as page thrashing. In many cases, the data on an accelerator's PSU is managed by—e.g., the memory management function for the accelerator's PSU is performed by—either the accelerator's MMU, a driver for the accelerator running on the host system/OS, or a cooperation between these two elements.

Figure 9:
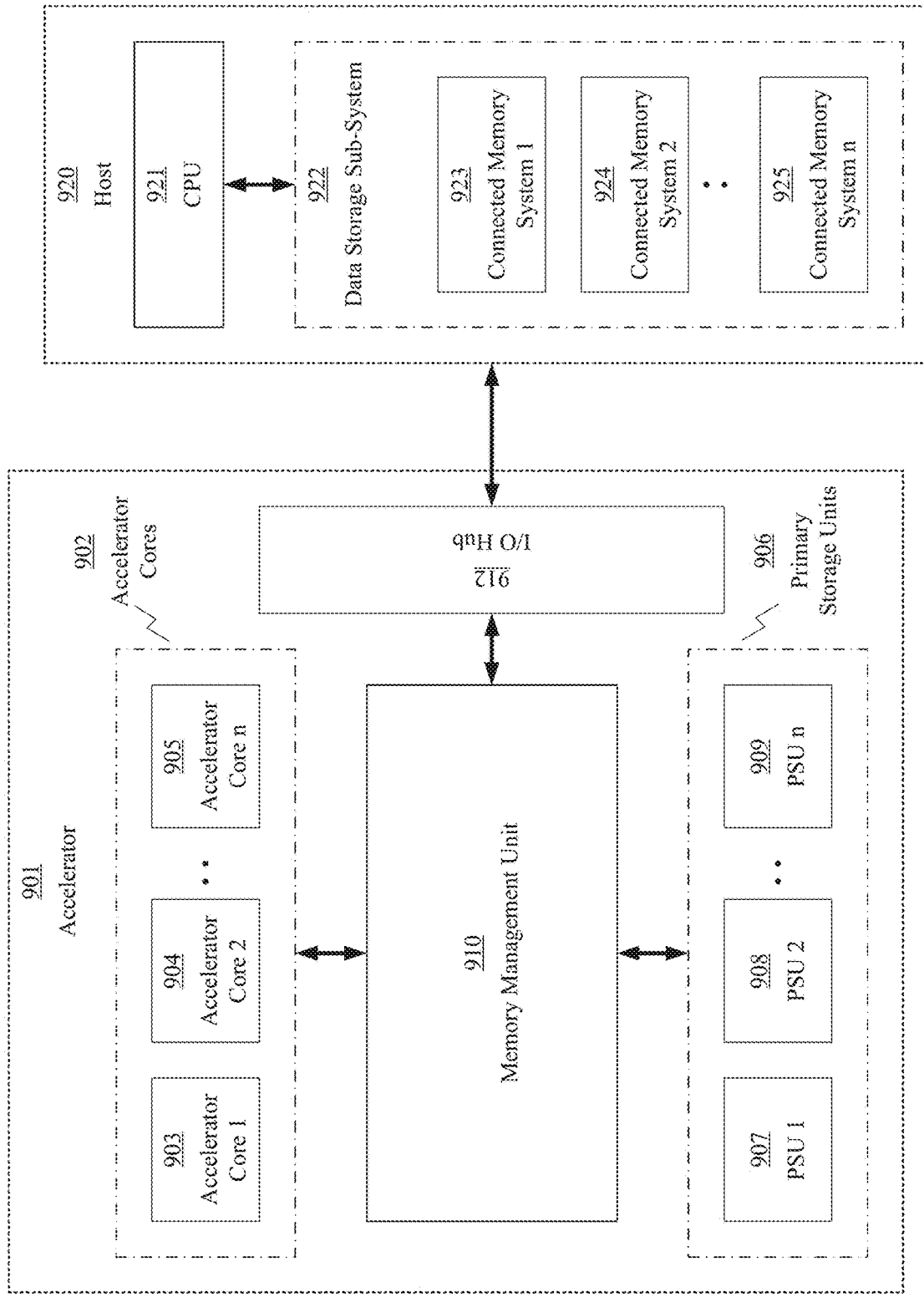
FIG. 9 is a simplified diagram illustrating an accelerator.

FIG. 9 is a simplified diagram illustrating an accelerator as just described. As depicted in FIG. 9, computer system 900 may consist of a host 920 which is connected to an accelerator 901. Host 920 may contain a CPU 921 and a data storage sub-system 922. Data storage sub-system 922 may consist of a plurality of connected memory systems, shown here as connected memory systems 923, 924, and 925. In general, connected memory systems 923, 924, and 925 could be a variety of memory storage devices, such as DRAM (e.g., a primary storage unit), an SSD (e.g., an secondary storage unit), an HDD, a magnetic tape disk, or the like. Additionally, CPU 921 is connected to and may exchange data with data storage sub-system 922. With regards to accelerator 901, according to FIG. 9, accelerator 901 comprises accelerator cores 902, primary storage units 906, memory management unit 910, and I/O hub 912. As shown by the figure, accelerator cores 902 may contain a plurality of accelerator cores, shown here as accelerator cores 903, 904, and 905. Similarly, primary storage units 906 may contain a plurality of primary storage units, shown here as primary storage units 907, 908, and 909. Also, memory management unit 910 is connected to accelerator cores 902, primary storage unit 906, and I/O hub 912. I/O hub 912 itself is connected to host 920.

A key part of the memory management for an accelerator is prefetching pages to avoid unnecessary page faults, since retrieving pages from the system's CPU often takes a significant amount of time. However, previous methods of prefetching are inefficient. For example, sequential prefetching involves prefetching fixed amounts of pages of data, which often leads to too little data being prefetched and results in many unnecessary page faults. As another example, many prefetching schemes assume that any spatial locality will be linear, like the layout of the physical memory. In other words, a particularly important aspect about virtual and physical address spaces is that they are linear and sequential, e.g., page 0xFC4A95E3 is immediately after page 0xFC4A95E2. Many prefetching schemes assume that the data being used by a process will be similarly sequential. In other words, if a process is using data from page 0xFC4A95E2 then it will likely use data from a page near 0xFC4A95E2 (if not necessarily the pages immediately adjacent, e.g., 0xFC4A95E1 and 0xFC4A95E3). While this assumption works from some processes and some data types, it fails entirely with multi-dimensional arrays (arrays of two or more dimensions). The reason for this is that the way a multidimensional array is stored in virtual memory may be different from how the process accesses values of that array.

For example, take a two dimension array $$\hat{x} = \begin{pmatrix} x_0 & x_1 & x_2 & x_3 \\ x_4 & x_5 & x_6 & x_7 \\ x_8 & x_9 & x_{10} & x_{11} \\ x_{12} & x_{13} & x_{14} & x_{15} \end{pmatrix}.$$

This array may be stored in memory row, by row, so that $x_0$ resides in memory location 0xA92EF3150, followed by $x_1$ (0xA92EF3151), $x_2$ (0xA92EF3152), $x_3$ (0xA92EF3153), $x_4$ (0xA92EF3154), and $x_5$ (0xA92EF3155) until, finally, $x_{15}$ resides in memory location (0xA92EF315F). In other words, the array is stored in memory in the form $\hat{x}[0][j]$, $\hat{x}[1][j], \ldots, \hat{x}[i-1][j], \hat{x}[i][j]$, where i indicates the i-th row and j indicates the j-th item of row i. In contrast, the process using array $\hat{x}$ may instead access the array column by column, so that the program accesses $x_0$ (memory location) 0xA92EF3150, followed by $x_4$ (0xA92EF3151), $x_8$ (0xA92EF3152), $x_{12}$ (0xA92EF3153), $x_1$ (0xA92EF3154), and $x_5$ (0xA92EF3155) until, finally, $x_{15}$ is accessed (memory location 0xA92EF315F). In other words, the array is accessed in the form $\hat{x}[i][0], \hat{x}[i][1], \ldots, \hat{x}[i][j-1], \hat{x}[i][j]$. This operation often happens in matrix multiplication, since the first matrix's rows are dot multiplied with the second matrix's columns. Should a prefetching strategy not take this into account, the prefetching system will harm system performance, since it is unnecessarily transferring data (and likely evicting other data to make room).

Figure 12:
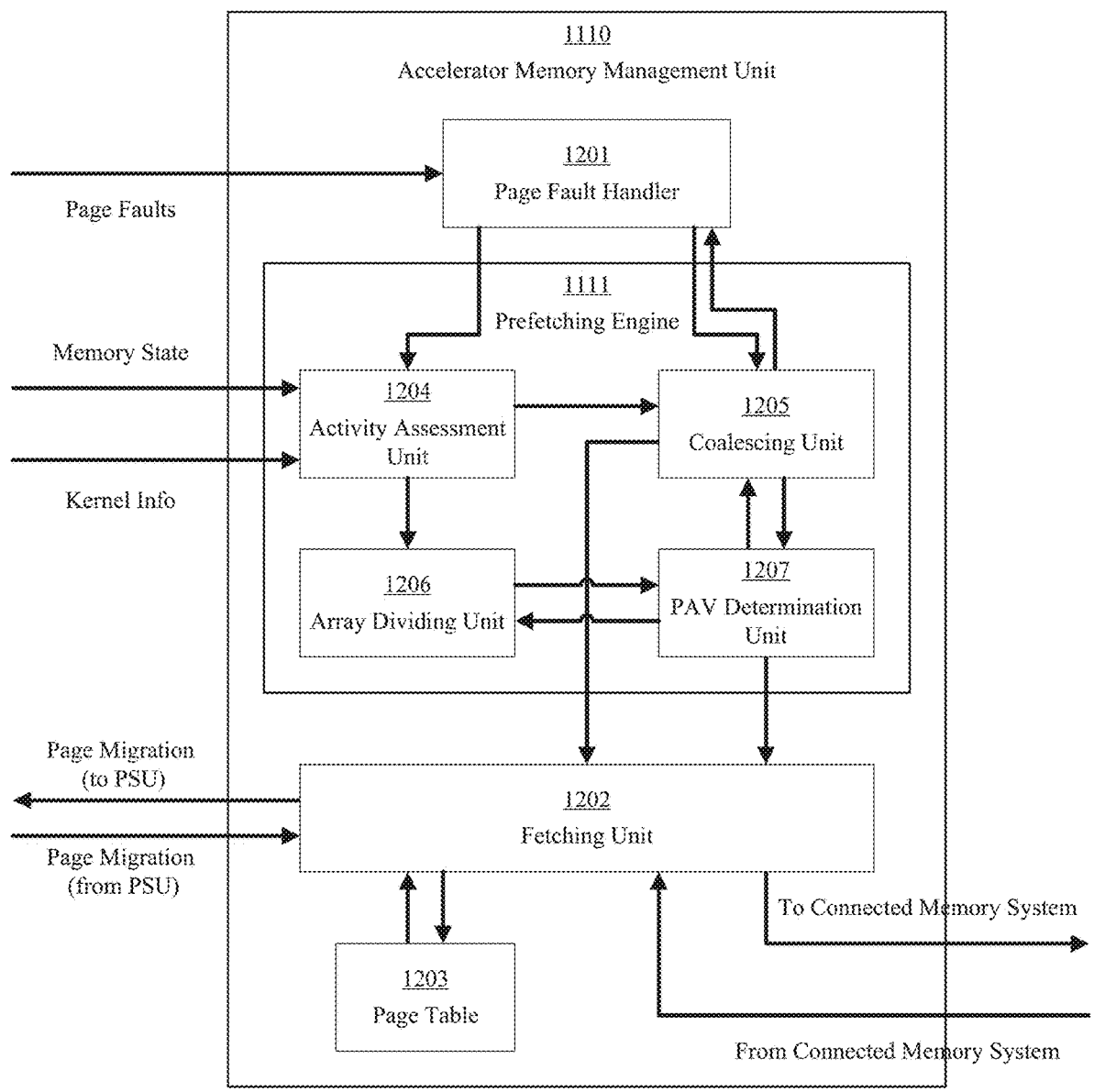
FIG. 12 is a simplified diagram illustrating a memory management unit (MMU) of an accelerator, according to some embodiments of the present disclosure.
Figure 18:
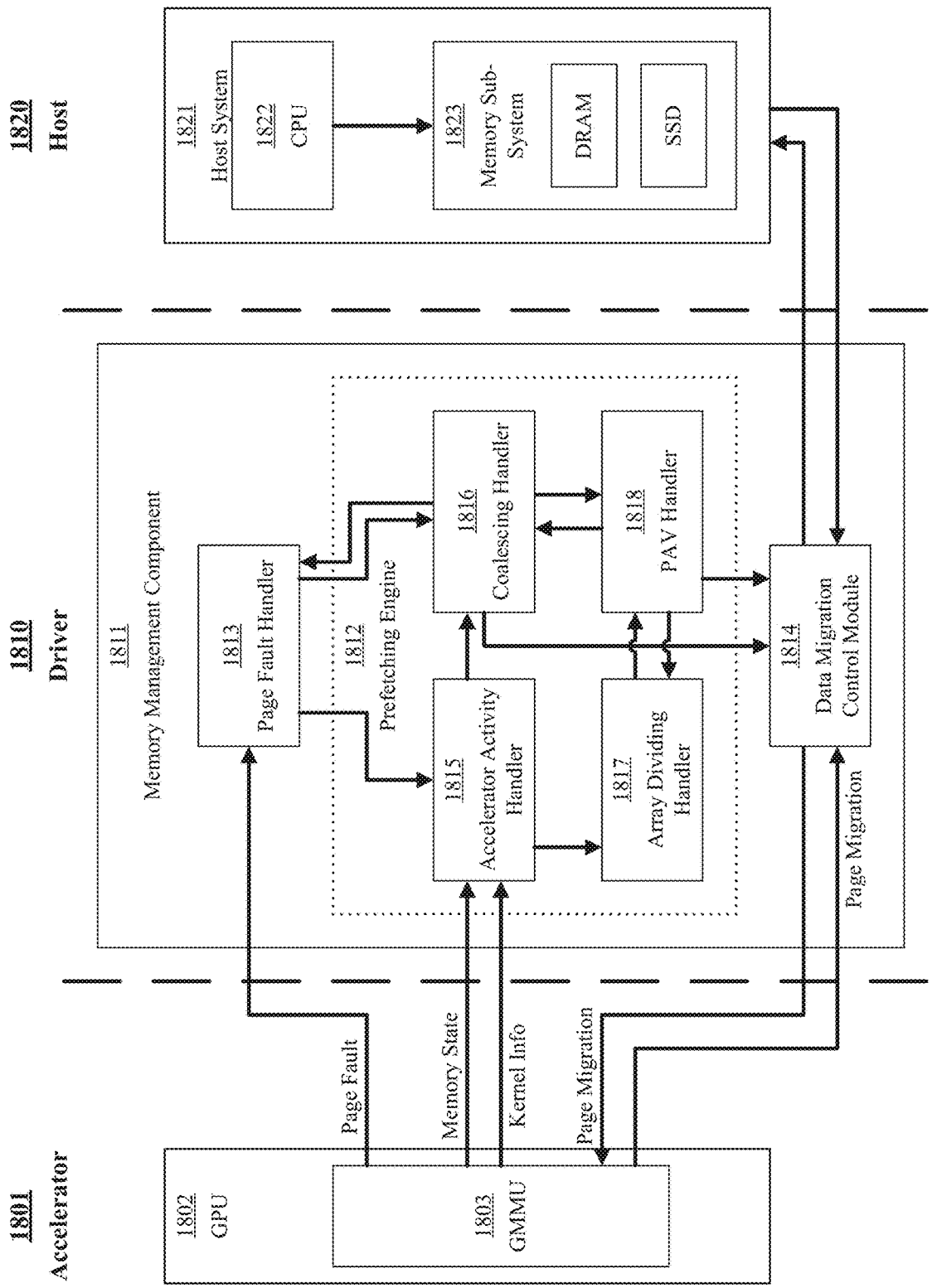
FIG. 18 is a simplified diagram illustrating how the selecting and prefetching of pages of data in an n-level sub-array may be decided and performed by a host system, according to some embodiments of the present disclosure.

To address the issue of effectively and efficiently prefetching data onto the primary storage of an accelerator using unified virtual memory in heterogenous computer systems, some embodiments of the present disclosure may begin by detecting an attempt to access a first page of data that is not currently stored on the primary storage unit of the accelerator (e.g., by accelerator memory management unit 1110 of FIG. 12 or by memory management component 1811 of FIG. 18). In some embodiments, detecting an attempt to access a page of data not currently stored on the accelerator's PSU could comprise detecting a page fault. The page fault may be the result of a kernel being executed on the accelerator attempting to reference a virtual memory address that is currently not stored on the accelerator's PSU. For example, the page the virtual memory address corresponds to may be stored on the host system's PSU or may be paged out to the host system's SSU. In some embodiments, detecting an attempt to access a first page of data not currently stored on the PSU may be the result of a prediction that a kernel being executed on the accelerator is likely to access the page in the near future. For example, if the kernel has been accessing contiguous pages in a mostly sequential order, then it could be predicted that the kernel will attempt to access a page that is slightly further in the order and that is not yet loaded into the accelerator's PSU.

After detecting an attempt to access the first page of data that is currently stored on the accelerator's PSU, some embodiments may—in response to the detection of the attempt—determine (e.g., by accelerator memory management unit 1110 of FIG. 12 or by memory management component 1811 of FIG. 18) if the first page of data corresponds to part of an array with a certain number of dimensions (e.g., a 1-dimensional array, a 2-dimensional array, a 3-dimensional array, a 4-dimensional array, etc.). For example, if the array corresponds to a 3-dimensional array, the first page of data may store array entries from array entry [127][63][0] to [127][63][1023]. In general, whether a particular page—and thus the data stored at each memory address of that page—corresponds to an array may be determined by a variety of means. For example, in some embodiments, metadata may be created that indicates which pages/virtual memory addresses correspond to an array and what the dimensions of the array is. This metadata could be created by the kernel using the array, by specialized instructions/source code that creates the metadata, or by an analysis of the memory and the kernel's access patterns to the memory storing the array.

If it is determined that the first page of data is part of an array, some embodiments may divide the array into a number of sub-arrays (e.g., by array dividing unit 1206 of FIG. 12 or by array dividing handler 1817 of FIG. 18). For clarity, the sub-arrays created by dividing the complete array may be called 1st level sub-arrays. Any sub-sub-arrays created by dividing a 1st level sub-array may be called a 2nd level sub-array. And in generally, any sub-arrays created by dividing an n-level sub-array are called (n+1)-level sub-arrays. For simplicity, the complete undivided array may be thought of and referred to as the 0th level sub-array. In some embodiments, the 1st level sub-array containing the first page of data may be further divided into a 2nd level sub-array. And, in general, in some embodiments the n-level sub-array containing the first page of data may be recursively divided into (n+1)-level sub-arrays until a division stopping condition is met. Note that, in many embodiments, the array is only logically divided into sub-arrays, but no physical changes necessarily happen to the array or the memory storing it. In other words, a sub-array may be merely a reference to a particular bounded portion of the array and not a physically separate copy of that portion of the array. The information on each sub-array may be recorded as metadata that is used during the process of responding to the attempt to access the first page of data.

Figure 10:
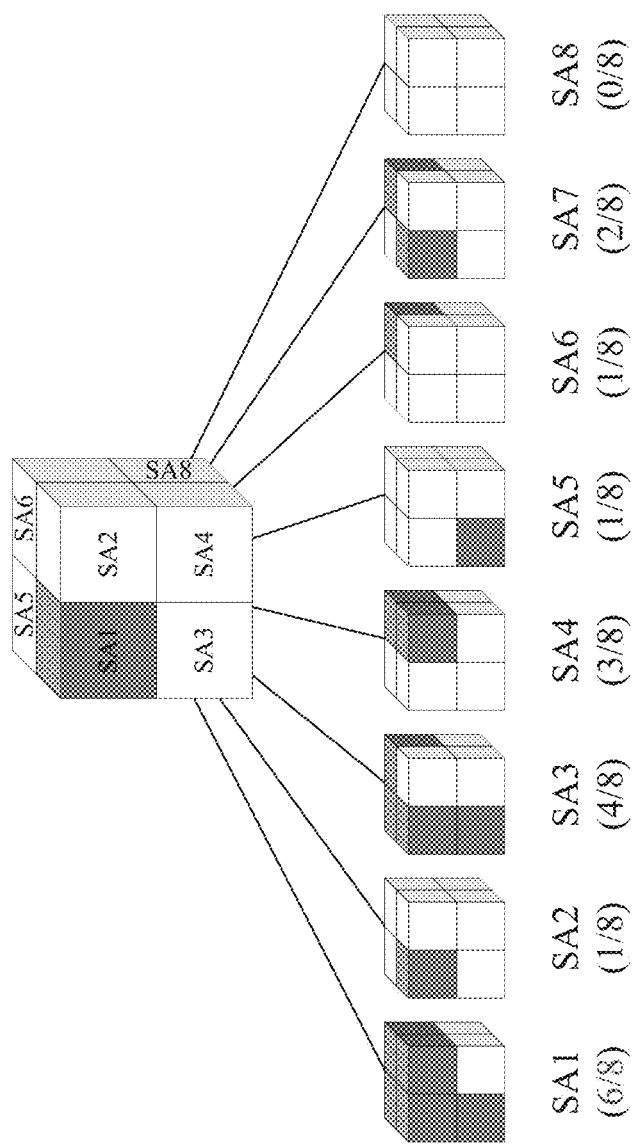
FIG. 10 illustrates the recursive, bottom-up procedure for determining what pages of a multi-dimensional data structure to prefetch, according to some embodiments of the present disclosure.

FIG. 10 is a diagram illustrating how an array can be recursively divided into sub-arrays. As shown by FIG. 10, an array (composed of sub-arrays SA1, SA2, SA3, SA4, SA5, SA6, SA7, and SA8) is divided into 8 sub-arrays. These sub-arrays are then divided into sub-sub-arrays. Also shown by FIG. 10 is how it is recursively determined if a sub-array (or array) should be prefetched. Taking sub-array SA1 as an example, sub-array SA1 is divided into 8 sub-sub-arrays. These sub-sub-arrays are then evaluated to determine if a threshold number of pages have been previously fetched. If they have been, the sub-sub-array is marked as having met the threshold condition (here, the condition is over half of the pages have previously been fetched). These sub-sub-arrays are shown in grey. After this is determined, it is determined if enough of the sub-sub-arrays composing SA1 have met the threshold condition (here, that means more than have of the sub-sub-arrays). Since 6 of the 8 sub-sub-arrays of sub-array SA1 meet the threshold condition, SA1 as a whole is marked as meeting the threshold condition. This means that every page in SA1 (e.g., every page in every sub-sub-array composing SA1) is also prefetched. The process then continues, with SA1 now being considered to have met the threshold condition for the next higher level of sub-array.

In some embodiments, the division stopping condition may be based on whether a particular level of sub-arrays has been reached (e.g., has the 4th level of sub-arrays been reached). In some embodiments, the division stopping condition may be based on whether the sub-arrays are below a certain size (e.g., whether the sub-array contains fewer than a certain number of entries, whether the sub-array contains fewer than a certain number of pages of data, or whether the sub-array has a dimension or dimensions under a certain size). In some embodiments, the division stopping condition may also be based on the activity of the accelerator. In some embodiments, the division stopping condition may also be based on the total number of pages being used by the kernel to which the page belong. In other words, the division stopping condition may be based on the total size of the kernel and all its data (e.g., how much memory the kernel would take up if all its pages were fetched into the accelerator's primary storage unit). In some embodiments the division stopping condition may also be based on the number of pages or total size of the array (or one of the n-level sub-arrays). Additionally, in some embodiments, the division stopping condition may be based on an evaluation strategy. The evaluation strategy may include the criteria/algorithm by which the optimal level of granularity in assessing chunks of the array (e.g., the optimal size of the various sub-arrays) is determined.

In some embodiments, after the division stopping condition is met, it may be determined if the lowest level sub-array (i.e., the sub-array with the highest level) containing the first page of data meets the page access volume condition (e.g., by PAV determination unit 1207 of FIG. 12 or by PAV handler 1818 of FIG. 18). If this n-level sub-array meets the page access volume condition, then all pages in the n-level sub-array are selected for prefetching. Then, the process recursively repeats, with the (n−1)-level sub-array containing the n-level sub-array may also be evaluated to determine if it meets the page access volume condition. If it does, then all pages in the (n−1)-level sub-array are also selected for prefetching. In general, this process may be recursively repeated until the n-level sub-array being evaluated does not meet the page access volume condition.

In some embodiments, the page access volume condition may be based on—for the highest level sub-array—having a threshold number of pages fetched onto the accelerator's PSU or—for the other n-level sub-arrays—may be based on having a threshold number of their composing (n−1)-level sub-arrays also meet the (n−1)-level sub-arrays' page access volume condition. In some embodiments, the page access volume condition may be based on the activity of the accelerator. In some embodiments, the page access volume condition may also be based on the total number of pages being used by the kernel to which the first page of data belong. In other words, the page access volume condition may be based on the total size of the kernel and all its data (e.g., how much memory the kernel would take up if all its pages of data were fetched into the accelerator's primary storage unit). Similarly, in some embodiments, the page access volume condition may also be based on the number of pages neighboring the first page of data that have already been fetched (or, equivalently, that have not been fetched). In other words, the page access volume condition may be based on how much additional data would need to be fetched for a given page access volume condition. In some embodiments, the page access volume condition may also be based on the number of pages or total size of the array (or one of the n-level sub-arrays). Additionally, in some embodiments, the page access volume condition may be based on a fetching strategy. The fetching strategy may include the criteria/algorithm by which an optimal number of pages to be fetch/prefetched is determined and the optimal threshold to set the page access volume condition to achieve this.

In some embodiments, the pages already selected for prefetching may be included in determining whether a sub-array meets its page access volume condition. For example, in some embodiments, the lowest level (e.g., smallest) n-level sub-array containing the page of data is first considered. If a threshold number of pages within this n-level sub-array have already been fetched (e.g., are in the accelerator's primary storage unit), the remaining pages may be selected for prefetched as well. Some embodiments may then consider the next highest level (e.g., next smallest) n-level sub-array (e.g., the (n+1)-level sub-array). If a threshold number of the n-level sub-arrays composing the (n+1)-level sub-array similarly have had a threshold number of pages already fetched, every page in the (n+1)-level sub-array (e.g., every page in every n-level sub-array composing the (n+1)-level sub-array) not already fetched may be selected for prefetching. In other words, an (n+1)-level sub-array may meet the threshold criteria for having all of its pages selected for prefetching if a threshold number of its n-level sub-arrays also meet their page access volume condition. Alternatively, every page in a (n+1)-level sub-array is selected for prefetching if a threshold number of pages in the (n+1)-level sub-array have previously been fetched. In both of these situations, a decision to prefetch pages on a lower level may be taken into account (e.g., if the pages of an n-level sub-array are being prefetched, those pages may be considered as having already been fetched when recursively deciding whether to prefetch for the (n+1)-level sub-array). This process can continue to repeat until the page access volume condition is not met.

After one of the n-level sub-arrays fails to meet the page access volume condition, the process may end. After the process ends, in some embodiments, the first page of data and all pages of data selected for prefetching may be transferred (e.g., by fetching unit 1202 of FIG. 12 or by data migration control module 1814 of FIG. 18) from a memory system connected to the accelerator into the accelerator's PSU. In some embodiments, this may involve retrieving data from the primary storage unit being used by a CPU of the host system the accelerator is connected to (e.g., from data storage sub-system 1122 of FIG. 11 or from memory sub-system 1823 of FIG. 18). In some embodiments, this may involve retrieving data from the primary storage unit of other accelerators connected to the same system. Also, in some embodiments this may involve retrieving data directly from a secondary storage unit attached to the host system.

Additionally, after detecting an attempt to access the first page of data and determining that the first page of data is part of an array, some embodiments may—in response to the detection of the attempt—assess the activity of the accelerator (e.g., by activity assessment unit 1204 of FIG. 12 or by accelerator activity handler 1815 of FIG. 18). In some embodiments, the activity of the accelerator could include the activity of kernels being executed on the accelerator. This kernel activity could include more general kernel activity, such as how many kernels are being currently run, the amount of memory being used by the kernels, the amount of memory being used by the kernels that has been referenced/accessed, and the like. The activity of the accelerator could also include specific kernel activity—e.g., the activity of specific kernels or groups of kernels—such as the length of time the kernel has been run, the amount of memory being used by the kernel, the amount of memory being used by the kernel that has actually been referenced/ accessed, the kernel's memory access patterns (e.g., the pages referenced/accessed and the relationship between them), and the like. The activity of the accelerator could also include recent or historical kernel activity—both general and specific. For example, some embodiments may consider the recent x number of seconds of the activity to assess an average or determine a trend in the activity of the executed kernels generally or in the activity of a specific kernel or group of kernels. The activity of the accelerator could also include predicted future kernel activity—either for kernel activity generally or specifically for a particular kernel or group of kernels.

Additionally, in some embodiments, the activity of the accelerator could include the usage of the primary storage unit of the accelerator. In some embodiments, the usage of the primary storage unit could include more general usage, such as the overall amount of pages (of data) stored, the overall amount of free/unused space remaining, the overall memory access patterns to the pages stored in the primary storage unit, the relative layout of these memory accesses, and the like. The activity of the accelerator could also include more specific usage, such as the overall amount of pages stored for a particular kernel, the overall pattern of memory accesses to these pages by a particular kernel, the duration a page or group of page has remained in the primary storage unit, the amount of times a page or group of pages has been referenced/accessed, the amount of times since a page or group of pages has last been referenced/accessed, whether the page or group of pages is frequently used by a different processor (e.g., a CPU of the host system), whether a particular page exhibits signs of thrashing, and the like. The activity of the accelerator could also include recent or historical usage of the primary storage unit—both general and specific. For example, some embodiments may consider the recent x number of seconds of the usage of the primary storage unit to assess an average or determine a trend in the usage of the primary storage unit, either generally, on the usage of specific pages or groups of pages belonging to specific kernels, or on the usage of a page of group of pages. The activity of the accelerator could also include predicted usage of the primary storage unit—either for usage generally or on the basis of a specific pages.

Additionally, in some embodiments, the activity of the accelerator could include additional information relating to the accelerator, such as the amount of pending kernels (e.g., kernels queued for execution but not yet executed), the nature of the pending kernels, the current temperature of the accelerator, the remaining headroom between the current temperature and maximum operating temperature, current power usage of the accelerator, and the like. The activity of the accelerator could also include recent or historical information regarding this additional information relating to the accelerator. For example, some embodiments may consider the recent x number of seconds of data regarding this additional information to assess an average or determine a trend in the usage of the primary storage unit. The activity of the accelerator could also include predicted future data regarding this additional information.

Figure 11:
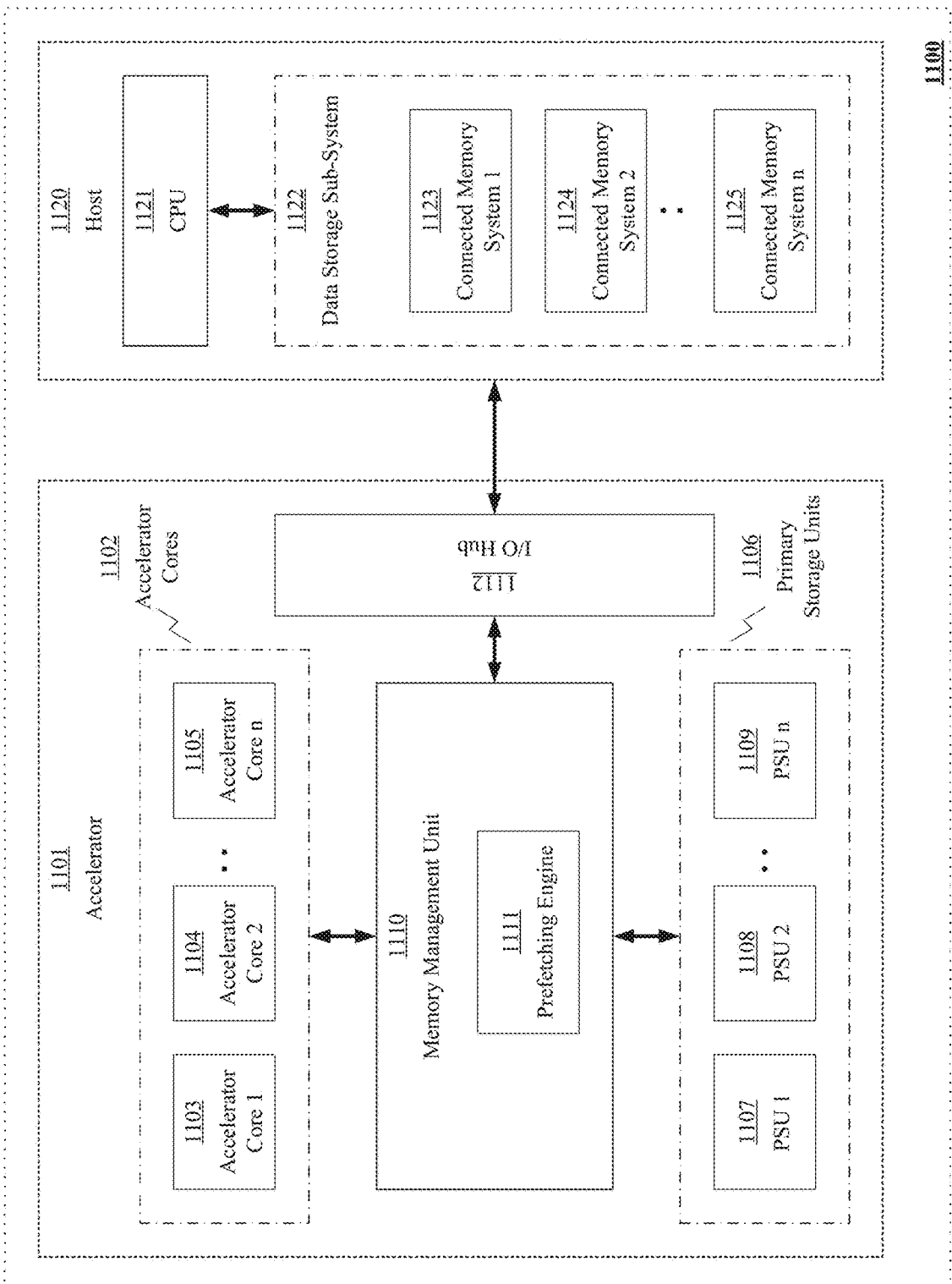
FIG. 11 is a depiction of an example computer system for employing a method for fetching data for an accelerator, according to some embodiments of the present disclosure.

FIG. 11 is a depiction of an example computer system 1100 for employing a method for managing the primary storage unit of an accelerator, according to some embodiments of the present disclosure. Although depicted generically, system 1100 may be implemented on any computer, such as a server, such as a desktop computer, a laptop computer, a tablet, or the like, configured to execute, for example, the method described in FIG. 12 below. As depicted in FIG. 11, computer system 1100 may consist of a host 1120 which is connected to an accelerator 1101. Host 1120 may contain a CPU 1121 and a data storage sub-system 1122. Data storage sub-system 1122 may include a plurality of connected memory systems, shown here as connected memory systems 1123, 1124, and 1125. In general, connected memory systems 1123, 1124, and 1125 could be a variety of memory storage devices, such as DRAM (e.g., a primary storage unit), an SSD (e.g., a secondary storage unit), an HDD, a magnetic tape disk, or the like. Additionally, CPU 1121 is connected to and may exchange data with data storage sub-system 1122.

With regards to accelerator 1101, according to FIG. 11, accelerator 1101 comprises accelerator cores 1102, primary storage units 1106, memory management unit 1110, and I/O hub 1112. As shown by the figure, accelerator cores 1102 may contain a plurality of accelerator cores, shown here as accelerator cores 1103, 1104, and 1105. Similarly, primary storage units 1106 may contain a plurality of primary storage units, shown here as primary storage units 1107, 1108, and 1109. Additionally, memory management unit 1110 also possesses a prefetching engine 1111 that could, for example, implement the method described in FIG. 13. Also, memory management unit 1110 is connected to accelerator cores 1102, primary storage unit 1106, and I/O hub 1112. I/O hub 1112 itself is connected to host 1120.

FIG. 12 is a simplified diagram illustrating a memory management unit (MMU) of an accelerator, according to some embodiments of the present disclosure. According to FIG. 12, memory management unit 1110 (from FIG. 11) may have a page fault handler 1201, a fetching unit 1202, a page table 1203, and a prefetching engine 1111 (from FIG. 11). Prefetching engine 1101 itself may have an activity assessment unit 1204, a coalescing unit 1205, an array dividing unit 1206, and a PAV determination unit 1207. As shown by the incoming arrows, accelerator memory management unit 1110 may receive a page fault. After receiving the page fault, page fault handler 1201 may determine if the page is part of an array. If the page is part of an array, page fault handler 1202 may respond to the page fault by preparing to fetch the page referenced in the page fault. Page fault handler 1201 may do so immediately or it may wait a certain amount of time before proceeding. In any event, after page fault handler 1201 begins to respond to the page fault, it may prompt activity assessment unit 1204 to assess the activity of the accelerator based on the accelerator's memory stage and the kernel info (e.g., the information about the processes running on the accelerator).

Based on the activity assessment of activity assessment unit 1204 and the pages requested in the page fault, array dividing unit 1206 may divide the array of data into sub-arrays until the division stopping condition is met. PAV determination unit 1207 may then use the sub-arrays created by array dividing unit 1206 to recursively determine which sub-arrays meet the page access volume condition. PAV determination unit 1207 may select all pages in a sub-array for prefetching if that sub-array meets its page access volume condition. PAV determination unit 1207 may recursively perform this operation on the sub-array containing the first page of data until the page access volume condition is not met. Fetching unit 1202 may then retrieve the first page of data and any pages of data selected for prefetching. After retrieving the pages of data, fetching unit 1202 may create an entry for them in page table 1203. Fetching unit 1202 may then store the retrieved pages in the accelerator's primary storage unit (e.g., one of primary storage units 1106 of FIG. 11, such as PSU 1107).

Additionally, after page fault handler 1201 receives the first page fault, but before PAV determination unit 1207 begins to determine if the sub-arrays from array dividing unit 1206 meet their page access volume condition, page fault handler 1201 may receive a second page fault referencing a second page of data that is also part of the array. In this event, page fault handler may prompt coalescing unit 1205 to determine if the page faults will be combined into one retrieval operation. Based on the activity assessment of activity assessment unit 1204 and the pages requested in the page faults, coalescing unit 1205 may determine whether the first page of data referenced in the first page fault and the second page of data referenced in the second page fault should be retrieved as part of one sub-array (along with selecting the other pages in the sub-array for prefetching).

To this end, coalescing unit 1205 may cooperate with PAV determination unit 1207 to determine whether to set the page access volume condition for the smallest sub-array containing both the first page of data and the second page of data so that both pages will be retrieved together. If PAV determination unit 1207—with input from coalescing unit 1205—sets the page access volume size for the smallest sub-array containing both pages such that the sub-array meets the page access volume condition, then coalescing unit 1205 will coalesce the retrieval of the first page of data and the second page of data into one retrieval operation. Otherwise, PAV determination unit 1207 may consider that the second page of data will be fetched but will not set the page access volume condition so that both pages are retrieved together. Coalescing unit 1205 may also report to page fault handler 1201 that the second page fault will not be coalesced with the first page fault, which may prompt page fault handler 1201 to respond to the second page fault on its own (e.g., in the same manner the first page fault was handled).

In general, prefetching engine 1111 may be comprised of hardware, software, or a combination of hardware and software. For example, fetching unit 1202 may be implemented by circuitry on the GPU that receives memory addresses and then uses the memory addresses to retrieve pages from a connected memory system and store them on the accelerator's PSU. Similarly, in some embodiments, accelerator memory management unit 1110 may have circuitry that handles the initial receipt of a page fault from a kernel running on the accelerator (shown here as page fault handler 1201). This circuitry may in turn trigger a page fault handling routine. The page fault handling routine may be firmware on the GPU that the circuitry triggers to begin executing on the GPU (in a manner analogous to how a page fault exception from an application on a CPU triggers a context switch to kernel mode and the execution of the kernel's page fault handler). This page fault handler routine may then implement activity assessment unit 1204 by assessing the activity of the accelerator by reviewing the memory state (e.g., the contents of the accelerator's PSU). The page fault handler may also implement array dividing unit 1206 by using the activity assessment and metadata about the array to determine what sub-arrays the array will be divided into. The page fault handler may then implement PAV determination unit 1207 by using the sub-arrays generated by array dividing unit 1206 to set the page access volume condition, to determine whether the sub-arrays meet the page access volume condition, and to select the pages of the sub-arrays that meet the page access volume condition for prefetching.

Figure 13:
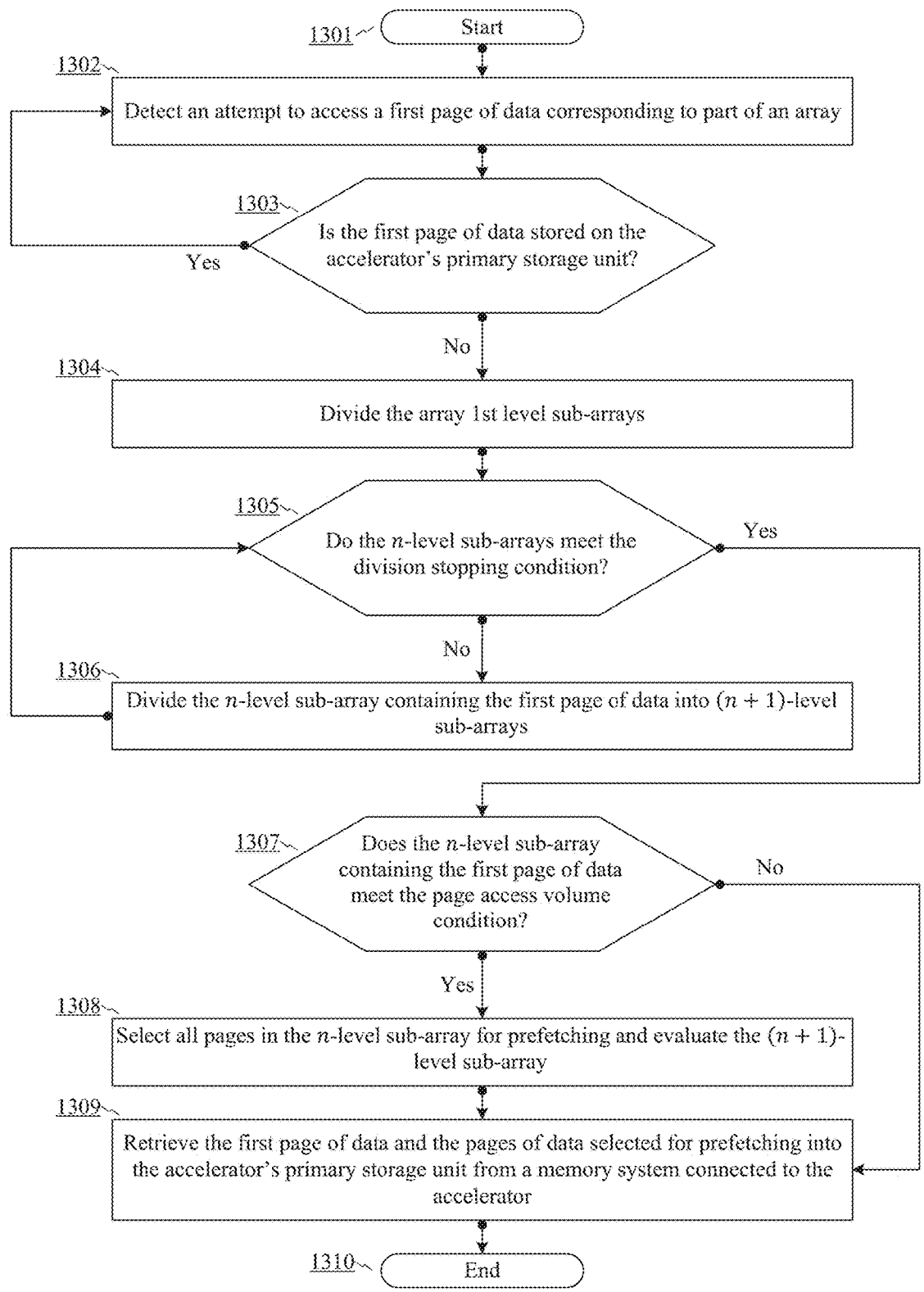
FIG. 13 is a flowchart of an exemplary method for fetching data for an accelerator, according to some embodiments of the present disclosure.

However, in some embodiments, activity assessment unit 1204—or portions of activity assessment unit 1204—may instead be implemented in hardware as circuitry. For example, accelerator memory management unit 1110 could have circuitry dedicated to monitoring the pages accessed or referenced by the kernel being executed on the accelerator. This information could be stored in a buffer inside accelerator memory management unit 1110. Then, when a page fault occurs, the page fault handler could trigger a firmware routine that uses the information stored in the buffer, possibly alongside an analysis of the current state and use of the accelerator's PSU, to come up with a more complete activity assessment. In a similar manner, PAV determination unit 1207 may utilize a firmware to select the page access volume condition and to determine what sub-arrays meet the page access volume condition, but then use dedicated circuitry to handle translating the sub-arrays meeting the page access volume condition into addresses of pages of data for retrieval and to then retrieve those addresses from the connected memory system. Also, portions of fetching unit 1202 may be implemented as firmware. For example, dedicated circuitry within fetching unit 1202 may perform retrieval operations but could invoke firmware to update page table 1203. FIG. 13 is a flowchart of an exemplary method for fetching data for an accelerator, according to some embodiments of the present disclosure. As shown by FIG. 13, in step 1302, an attempt to access a first page of data—corresponding to a part of an array—is detected. For example, accelerator memory management unit 1110 could detect an instruction by a kernel running on the accelerator referencing a particular virtual memory address. Next, in step 1303, it is determined if the first page of data is stored on the accelerator's primary storage unit. This may be performed, for example, by memory management unit 1110, which may consult the triggering kernel's page table to determine if the page containing the referenced virtual memory address is assigned a corresponding physical address in the accelerator's primary storage unit. If the first page of data is stored on the accelerator's primary storage unit, the method returns to step 1302. On the other hand, if the first page of data is not stored on the accelerator's primary storage unit, then the method proceeds to step 1304.

In step 1304, the array is divided into 1st level sub-arrays. For example, array dividing unit 1206 of prefetching engine 1111 may divide the array into $2^{array's\ number\ of\ dimensions}$ equally sized sub-arrays. This may involve creating metadata indicating the pages—or memory addresses—that mark the boundaries of each sub-array. Then, in step 1305, it is determined if the current n-level sub-arrays (the 1st level sub-arrays for the first iteration) meets the division stopping condition. If in step 1305 the current n-level sub-array does meet the division stopping condition, then the method proceeds to step 1307. On the other hand, if the current n-level sub-array does not meet the division stopping condition, the method proceeds to step 1306. In step 1306, the current n-level sub-array that contains the first page of data is divided into (n+1)-level sub-arrays. The method then returns to step 1305, with the (n+1)-level sub-arrays created in step 1306 becoming the current n-level sub-arrays.

As stated above, if in step 1305 the current n-level sub-array does meet the division stopping condition, then the method proceeds to step 1307. In step 1307, it is determined if the current n-level sub-array containing the first page of data meets the page access volume condition.

For example, PAV determination unit 1207 of prefetching engine 1111 may determine, for the lowest n-level sub-array, if a threshold number of pages of data—such as 50%—comprising the n-level sub-array have been (and currently are) transferred to the accelerator's PSU. Similarly, PAV determination unit 1207 of prefetching engine 1111 may determine, for higher n-level sub-arrays, if a threshold number of the (n+1)-level sub-arrays comprising the n-level sub-array—such as 50%—have met their respective page access volume conditions. If it is determined that the current n-level sub-array containing the first page of data does not meet the page access volume condition, then the method proceeds to step 1309.

On the other hand, if it is determined that the current n-level sub-array containing the first page of data does meet the page access volume condition, then the method proceeds to step 1308. In step 1308, all pages in the current n-level sub-array containing the first page of data not already fetched—or selected for fetching—are selected for prefetching. For example, PAV determination unit 1207 of prefetching engine 1111 may use the metadata generated by array dividing unit 1206 to determine all pages of data comprising the current n-level sub-array. The method then returns to step 1307, with the (n+1)-level sub-array containing the current n-level sub-array becoming the new current n-level sub-array.

As stated above, if in step 1307 it is determined that the current n-level sub-array containing the first page of data does not meet the page access volume condition, then the method proceeds to step 1309. In step 1309, the first page of data and any pages of data selected for prefetching are retrieved from a memory system connected to the accelerator into the accelerator's primary storage unit. This may involve, for example, fetching unit 1202 accessing the connected memory system (e.g., connected memory system 1122 of FIG. 11) to copy the pages of data from the connected memory system to a buffer or to the accelerator's PSU. After step 1309, the method may end.

Figure 14:
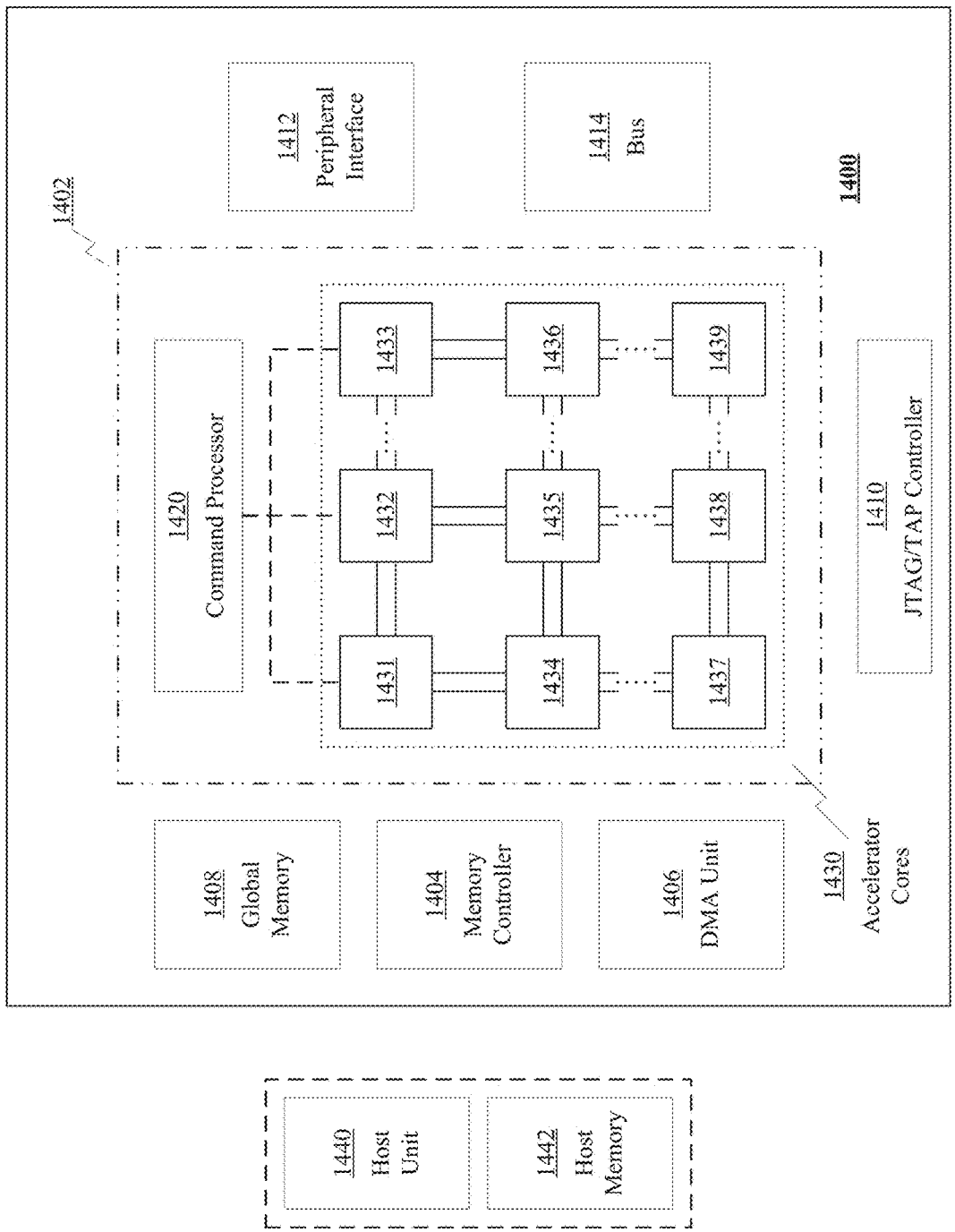
FIG. 14 is a schematic diagram illustrating a more detailed view of the architecture an exemplary accelerator, according to some embodiments of the present disclosure.

FIG. 14 is a schematic diagram illustrating a more detailed view of the architecture an exemplary accelerator, according to some embodiments of the present disclosure. Specifically, FIG. 14 illustrates a neural network processing architecture 1400, which could be an accelerator unit for an artificial neural network, an FPGA, an ASIC, or a variety of other types of accelerators. As shown by FIG. 14, accelerator unit 1400 can include an accelerator processing system 1402, a memory controller 1404, a direct memory access (DMA) unit 1406, a global memory 1408, a Joint Test Action Group (JTAG)/Test Access End (TAP) controller 1410, a peripheral interface 1412, a bus 1414, and the like. It is appreciated that, accelerator processing system 1402 can perform algorithmic operations (e.g., machine learning operations) based on communicated data.

Accelerator processing system 1402 can include a command processor 1420 and a plurality of accelerator cores 1430. Command processor 1420 may act to control and coordinate one or more accelerator cores, shown here as accelerator cores 1431, 1432, 1433, 1434, 1435, 1436, 1437, 1438, and 1439. Each of the accelerator cores 1430 may provide a subset of the synapse/neuron circuitry for parallel computation (e.g., the artificial neural network). For example, the first layer of accelerator cores 1430 of FIG. 14 may provide circuitry representing an input layer to an artificial neural network, while the second layer of accelerator cores 1430 may provide circuitry representing a hidden layer of the artificial neural network. In some embodiments, accelerator processing system 1402 can be implemented as one or more GPUs, NPUs, TPUs, FPGAs, ASICs, or other heterogeneous accelerator units.

Accelerator cores 1430, for example, can include one or more processing elements that each include single instruction, multiple data (SIMD) architecture including one or more processing units configured to perform one or more operations (e.g., multiplication, addition, multiply-accumulate, etc.) based on instructions received from command processor 1420. To perform the operation on the communicated data packets, accelerator cores 1430 can include one or more processing elements for processing information in the data packets. Each processing element may comprise any number of processing units. In some embodiments, accelerator cores 1430 can be considered a tile or the like. In some embodiments, the plurality of accelerator cores 1430 can be communicatively coupled with each other. For example, the plurality of accelerator cores 1430 can be connected with a single directional ring bus, which supports efficient pipelining for large neural network models. The architecture of accelerator cores 1430 will be explained in detail with respect to FIG. 15.

Accelerator processing architecture 1400 can also communicate with a host unit 1440. Host unit 1440 can be one or more processing unit (e.g., an X86 central processing unit). As shown in FIG. 14, host unit 1440 may be associated with host memory 1442. In some embodiments, host memory 1442 may be an internal memory or an external memory associated with host unit 1440. In some embodiments, host memory 1442 may comprise a host disk, which is an external memory configured to provide additional memory for host unit 1440. Host memory 1442 can be a double data rate synchronous dynamic random-access memory (e.g., DDR SDRAM) or the like. Host memory 1442 can be configured to store a large amount of data with slower access speed, compared to the on-chip memory integrated within one or more processors, acting as a higher-level cache. The data stored in host memory 1442 may be transferred to accelerator processing architecture 1400 to be used for executing neural network models.

In some embodiments, a host system having host unit 1440 and host memory 1442 can comprise a compiler (not shown). The compiler is a program or computer software that transforms computer codes written in one programming language into NPU instructions to create an executable program. In machine learning applications, a compiler can perform a variety of operations, for example, pre-processing, lexical analysis, parsing, semantic analysis, conversion of input programs to an intermediate representation, code optimization, and code generation, or combinations thereof. For example, the compiler can compile a neural network to generate static parameters, e.g., connections among neurons and weights of the neurons.

In some embodiments, the host system 1440 may push one or more commands to accelerator processing system 1402. As discussed above, these commands can be further processed by command processor 1420 of accelerator processing system 1402, temporarily stored in an instruction buffer of accelerator processing architecture 1400, and distributed to one or more corresponding accelerator cores (e.g., accelerator cores 1431 and 1432) or processing elements. Some of the commands can instruct DMA unit 1406 to load the instructions (generated by the compiler) and data from host memory 1442 into global memory 1408. The loaded instructions may then be distributed to each accelerator core assigned with the corresponding task, and the one or more accelerator cores can process these instructions.

Figure 15:
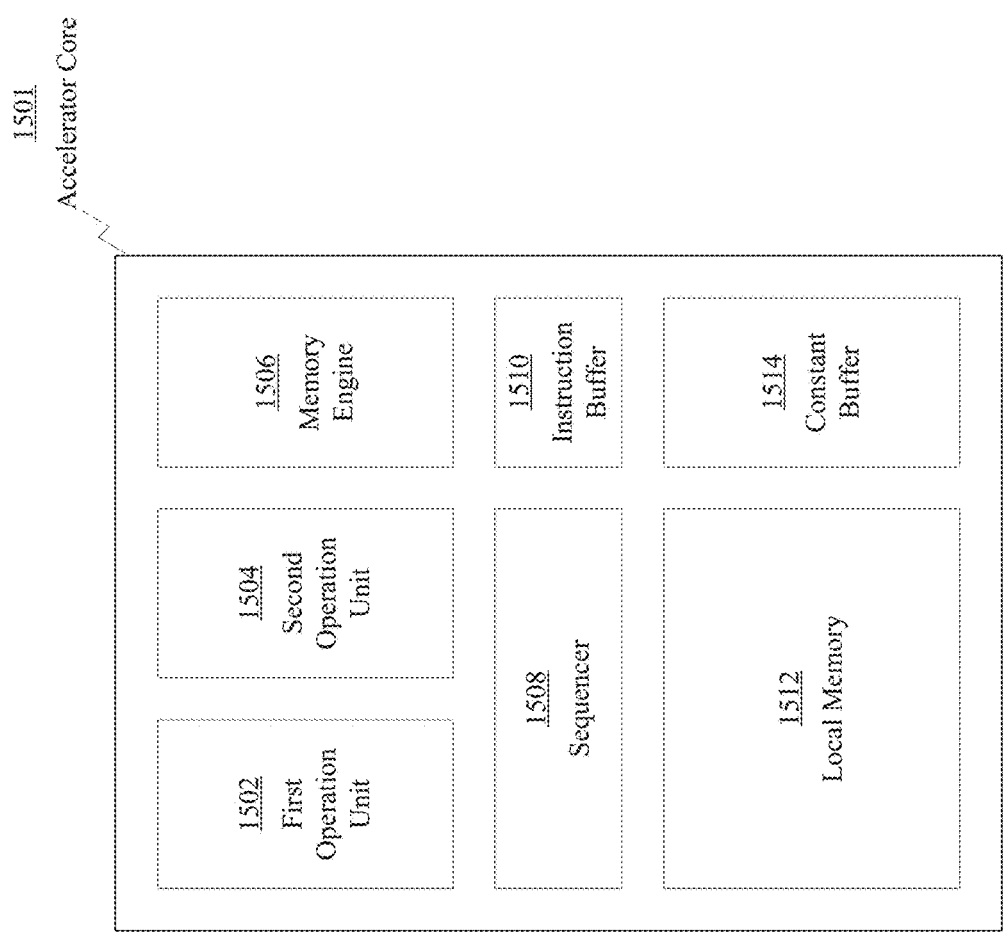
FIG. 15 illustrates an exemplary accelerator core architecture, according to some embodiments of the present disclosure.

It is appreciated that the first few instructions received by the accelerator cores 1430 may instruct the accelerator cores 1430 to load/store data from host memory 1442 into one or more local memories of the accelerator cores (e.g., local memory 1512 of FIG. 15). Each of the accelerator cores 1430 may then initiate the instruction pipeline, which involves fetching the instruction (e.g., via a sequencer) from the instruction buffer, decoding the instruction (e.g., via a DMA unit 1406), generating local memory addresses (e.g., corresponding to an operand), reading the source data, executing or loading/storing operations, and then writing back results.

Command processor 1420 can interact with the host unit 1440 and pass pertinent commands and data to accelerator processing system 1402. In some embodiments, command processor 1420 can interact with host unit 1440 under the supervision of kernel mode driver (KMD). In some embodiments, command processor 1420 can modify the pertinent commands to each accelerator core, so that accelerator cores 1430 can work in parallel as much as possible. The modified commands can be stored in an instruction buffer. In some embodiments, command processor 1420 can be configured to coordinate one or more accelerator cores for parallel execution.

Memory controller 1404, also referred to as a memory management unit, can manage the reading and writing of data to and from a specific memory block within global memory 1408 having on-chip memory blocks (e.g., blocks of second generation of high bandwidth memory (HBM2)) which serve as the primary storage unit/main memory for the accelerator. For example, memory controller 1404 can manage read/write data coming from outside accelerator processing system 1402 (e.g., from DMA unit 1406 or a DMA unit corresponding with another NPU) or from inside accelerator processing system 1402 (e.g., from a local memory in an accelerator core, such as accelerator core 1431, via a 2D mesh controlled command processor 1420). Moreover, while one memory controller is shown in FIG. 14, it is appreciated that more than one memory controller can be provided in accelerator unit 1400. For example, there can be one memory controller for each memory block (e.g., HBM2) within global memory 1408. In some embodiments, global memory 1408 can store instructions and data from host memory 1442 via DMA unit 1406. The instructions can then be distributed to an instruction buffer of each accelerator core assigned with the corresponding task, and the accelerator core can process these instructions accordingly.

Memory controller 1404 can generate memory addresses and initiate memory read or write cycles. Memory controller 1404 can contain several hardware registers that can be written and read by the one or more processors. The registers can include a memory address register, a byte-count register, one or more control registers, and other types of registers. These registers can specify some combination of the source, the destination, the direction of the transfer (reading from the input/output (I/O) device or writing to the I/O device), the size of the transfer unit, the number of bytes to transfer in one burst, or other typical features of memory controllers. Memory controller 1404 may also have a prefetching engine (not shown), such as prefetching engine 1111 in FIGS. 11 and 12. The prefetching engine in memory controller 1404 may control the amount of pages prefetched from host memory 1442.

DMA unit 1406 can assist with transferring data between host memory 1442 and global memory 1408. For example, DMA unit 1406 can assist with loading data or instructions from host memory 1442 into local memory of accelerator cores 1430. DMA unit 1406 can also assist with transferring data between multiple accelerators. In addition, DMA unit 1406 can assist with transferring data between multiple NPUs (e.g., accelerator processing system 1402 implemented on an NPU). For example, DMA unit 1406 can assist with transferring data between multiple accelerator cores 1430 or within each accelerator core. DMA unit 1406 can allow off-chip devices to access both on-chip and off-chip memory without causing a CPU interrupt. Thus, DMA unit 1406 can also generate memory addresses and initiate memory read or write cycles. DMA unit 1406 also can contain several hardware registers that can be written and read by the one or more processors, including a memory address register, a byte-count register, one or more control registers, and other types of registers. These registers can specify some combination of the source, the destination, the direction of the transfer (reading from the I/O device or writing to the I/O device), the size of the transfer unit, or the number of bytes to transfer in one burst. It is appreciated that accelerator unit 1400 can include a second DMA unit, which can be used to transfer data between other neural network processing architectures to allow multiple neural network processing architectures to communication directly without involving the host CPU.

JTAG/TAP controller 1410 can specify a dedicated debug port implementing a serial communications interface (e.g., a JTAG interface) for low-overhead access to the NPU without requiring direct external access to the system address and data buses. JTAG/TAP controller 1410 can also have on-chip test access interface (e.g., a TAP interface) that implements a protocol to access a set of test registers that present chip logic levels and device capabilities of various parts.

Peripheral interface 1412 (such as a peripheral component interconnect express (PCIe) interface), if present, serves as an (and typically the) inter-chip bus, providing communication between accelerator unit 1400 and other devices. Bus 1414 (such as a I$^2$C bus) includes both intra-chip bus and inter-chip buses. The intra-chip bus connects all internal components to one another as called for by the system architecture. While not all components are connected to every other component, all components do have some connection to other components they need to communicate with. The inter-chip bus connects the NPU with other devices, such as the off-chip memory or peripherals. For example, bus 1414 can provide high speed communication across accelerator cores and can also connect accelerator cores 1430 (via accelerator processing system 1402) with other units, such as the off-chip memory or peripherals. Typically, if there is a peripheral interface 1412 (e.g., the inter-chip bus), bus 1414 is solely concerned with intra-chip buses, though in some implementations it could still be concerned with specialized inter-bus communications.

Accelerator processing system 1402 can be configured to perform operations based on artificial neural networks. While accelerator processing architecture 1400 can be used for convolutional neural networks (CNNs) in some embodiments of the present disclosure, it is appreciated that accelerator processing architecture 1400 can be utilized in various neural networks, such as deep neural networks (DNNs), recurrent neural networks (RNNs), or the like. In addition, some embodiments can be configured for various processing architectures, such as CPUs, GPGPUs, GPUs, NPUs, TPUs, FPGAs, ASICs, any other types of heterogeneous accelerator processing units (HAPUs), or the like.

In operation, an artificial neural network, according to some embodiments of the present disclosure, may be transferred from host memory 1442 to the accelerator unit 1400 using the DMA unit 1406. The host unit 1440 may be connected to the accelerator unit 1400 via Peripheral interface 1412. In some embodiments, the artificial neural network and intermediate values of the artificial neural network may be stored in global memory 1408 which is controlled by memory controller 1404. Finally, artificial neural networks by be ran on the AI processor 1402, with command processor 1420 managing the processing of an input with an artificial neural network.

FIG. 15 illustrates an exemplary accelerator core architecture, according to some embodiments of the present disclosure. As shown in FIG. 15, accelerator core 1501 (e.g., accelerator cores 1430 of FIG. 14) can include one or more operation units such as first unit 1502 and second operation unit 1504, a memory engine 1506, a sequencer 1508, an instruction buffer 1510, a constant buffer 1514, a local memory 1512, or the like.

One or more operation units can include first operation unit 1502 and second operation unit 1504. First operation unit 1502 can be configured to perform operations on received data (e.g., matrices). In some embodiments, first operation unit 1502 can include one or more processing units configured to perform one or more operations (e.g., multiplication, addition, multiply-accumulate, element-wise operation, etc.). In some embodiments, first operation unit 1502 is configured to accelerate execution of convolution operations or matrix multiplication operations. Second operation unit 1504 can be configured to perform a pooling operation, an interpolation operation, a region-of-interest (ROI) operation, and the like. In some embodiments, second operation unit 1504 can include an interpolation unit, a pooling data path, and the like.

Memory engine 1506 can be configured to perform a data copy within a corresponding accelerator core 1501 or between two accelerator cores. DMA unit 1406 (from FIG. 14) can assist with copying data within a corresponding accelerator core 1501 or between two accelerator cores. For example, DMA unit 1406 can support memory engine 1506 to perform data copy from a local memory (e.g., local memory 1512 of FIG. 15) into a corresponding operation unit. Memory engine 1506 can also be configured to perform matrix transposition to make the matrix suitable to be used in the operation unit.

Sequencer 1508 can be coupled with instruction buffer 1510 and configured to retrieve commands and distribute the commands to components of accelerator core 1501. For example, sequencer 1508 can distribute convolution commands or multiplication commands to first operation unit 1502, distribute pooling commands to second operation unit 1504, or distribute data copy commands to memory engine 1506. Sequencer 1508 can also be configured to monitor execution of a neural network task and parallelize sub-tasks of the neural network task to improve efficiency of the execution. In some embodiments, first operation unit 1502, second operation unit 1504, and memory engine 1506 can run in parallel under control of sequencer 1508 according to instructions stored in instruction buffer 1510.

Instruction buffer 1510 can be configured to store instructions belonging to the corresponding accelerator core 1501. In some embodiments, instruction buffer 1510 is coupled with sequencer 1508 and provides instructions to the sequencer 1508. In some embodiments, instructions stored in instruction buffer 1510 can be transferred or modified by command processor 1420 (from FIG. 14). Constant buffer 1514 can be configured to store constant values. In some embodiments, constant values stored in constant buffer 1514 can be used by operation units such as first operation unit 1502 or second operation unit 1504 for batch normalization, quantization, de-quantization, or the like.

Local memory 1512 can provide storage space with fast read/write speed. To reduce possible interaction with a global memory, storage space of local memory 1512 can be implemented with large capacity. With the massive storage space, most of data access can be performed within accelerator core 1501 with reduced latency caused by data access. In some embodiments, to minimize data loading latency and energy consumption, static random-access memory (SRAM) integrated on chip can be used as local memory 1512. In some embodiments, local memory 1512 can have a capacity of 192 MB or above. According to some embodiments of the present disclosure, local memory 1512 be evenly distributed on chip to relieve dense wiring and heating issues.

Figure 16:
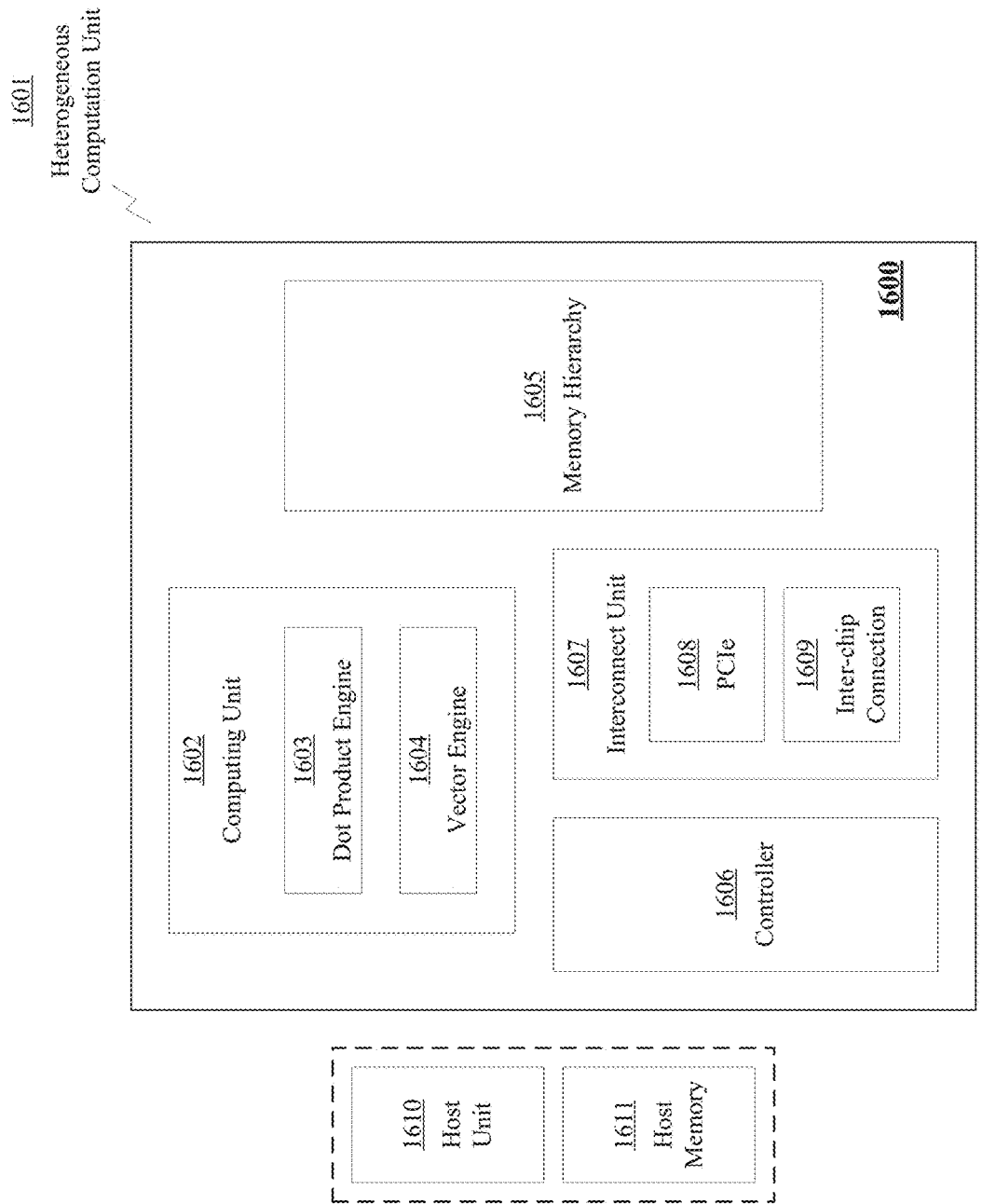
FIG. 16 is a schematic diagram illustrating an alternative architecture of an exemplary accelerator, according to some embodiments of the present disclosure.

FIG. 16 is a schematic diagram illustrating an alternative architecture of an exemplary accelerator as was illustrated in FIG. 14, according to some embodiments of the present disclosure. Like the exemplary accelerator architecture in FIG. 14, FIG. 16 illustrates an accelerator architecture 1600 that some embodiments of the present disclosure may be implemented on. In various embodiments, neural network processing architecture 1600 could be an accelerator unit for an artificial neural network, an FPGA, an ASIC, or a variety of other types of accelerators. As shown in FIG. 16, architecture 1600 can include a heterogeneous computation unit (HCU) 1601 and a corresponding host unit 1610 and host memory 1611, and the like. It is appreciated that, HCU 1601 can be a special-purpose computing device for facilitating neural network computing tasks. For example, HCU 1601 can perform algorithmic operations (e.g., machine learning operations) based on communicated data. HCU 1601 can be an accelerator, such as a GPU, an NPU, a TPU, an FPGA, an ASIC, or the like.

HCU 1601 can include one or more computing units 1602, a memory hierarchy 1605, a controller 1606 and an interconnect unit 1607. Each computing unit 1602 can read data from and write data into memory hierarchy 1605, and perform algorithmic operations (e.g., multiplication, addition, multiply-accumulate, etc.) on the data. In some embodiments, computing unit 1602 can include a plurality of engines for performing different operations. For example, as shown in FIG. 16, computing unit 1602 can include a dot product engine 1603, a vector engine 1604, and the like. Dot product engine 1603 can perform dot product operations such as multiplication and convolution. Vector engine 1604 can perform vector operations such as addition.

Memory hierarchy 1605 can have on-chip memory blocks (e.g., 4 blocks of HBM2) to serve as the primary storage unit/main memory. Memory hierarchy 1605 may also have a memory controller or memory management unit not shown). Memory hierarchy 1605 can store data and instructions, and provide other components, such as computing unit 1602 and interconnect 1607, with high speed access to the stored data and instructions. Interconnect unit 1607 can communicate data between HCU 1602 and other external components, such as host unit or another HCU. Interconnect unit 1607 can include a PCIe interface 1608 and an inter-chip connection 1609. PCIe interface 1608 provides communication between HCU and host unit 1610 or Ethernet. Inter-chip connection 1609 servers as an inter-chip bus, connecting the HCU with other devices, such as other HCUs, the off-chip memory or peripherals. The memory management unit of memory hierarchy 1605 may also have a prefetching engine (not shown), such as prefetching engine 1111 in FIG. 11. The prefetching engine in the memory management unit may control the amount of pages prefetched from host memory 1611.

Controller 1606 can control and coordinate the operations of other components such as computing unit 1602, interconnect unit 1607 and memory hierarchy 1605. For example, controller 1606 can control dot product engine 1603 or vector engine 1604 in computing unit 1602 and interconnect unit 1607 to facilitate the parallelization among these components.

Host memory 1611 can be off-chip memory such as a host CPU's memory. For example, host memory 1611 can be a DDR memory (e.g., DDR SDRAM) or the like. Host memory 1611 can be configured to store a large amount of data with slower access speed, compared to the on-chip memory integrated within one or more processors, acting as a higher-level cache. Host unit 1610 can be one or more processing units (e.g., an X86 CPU). In some embodiments, a host system having host unit 1610 and host memory 1611 can comprise a compiler (not shown). The compiler is a program or computer software that transforms computer codes written in one programming language into instructions for HCU 1601 to create an executable program. In machine learning applications, a compiler can perform a variety of operations, for example, pre-processing, lexical analysis, parsing, semantic analysis, conversion of input programs to an intermediate representation, code optimization, and code generation, or combinations thereof.

Figure 17:
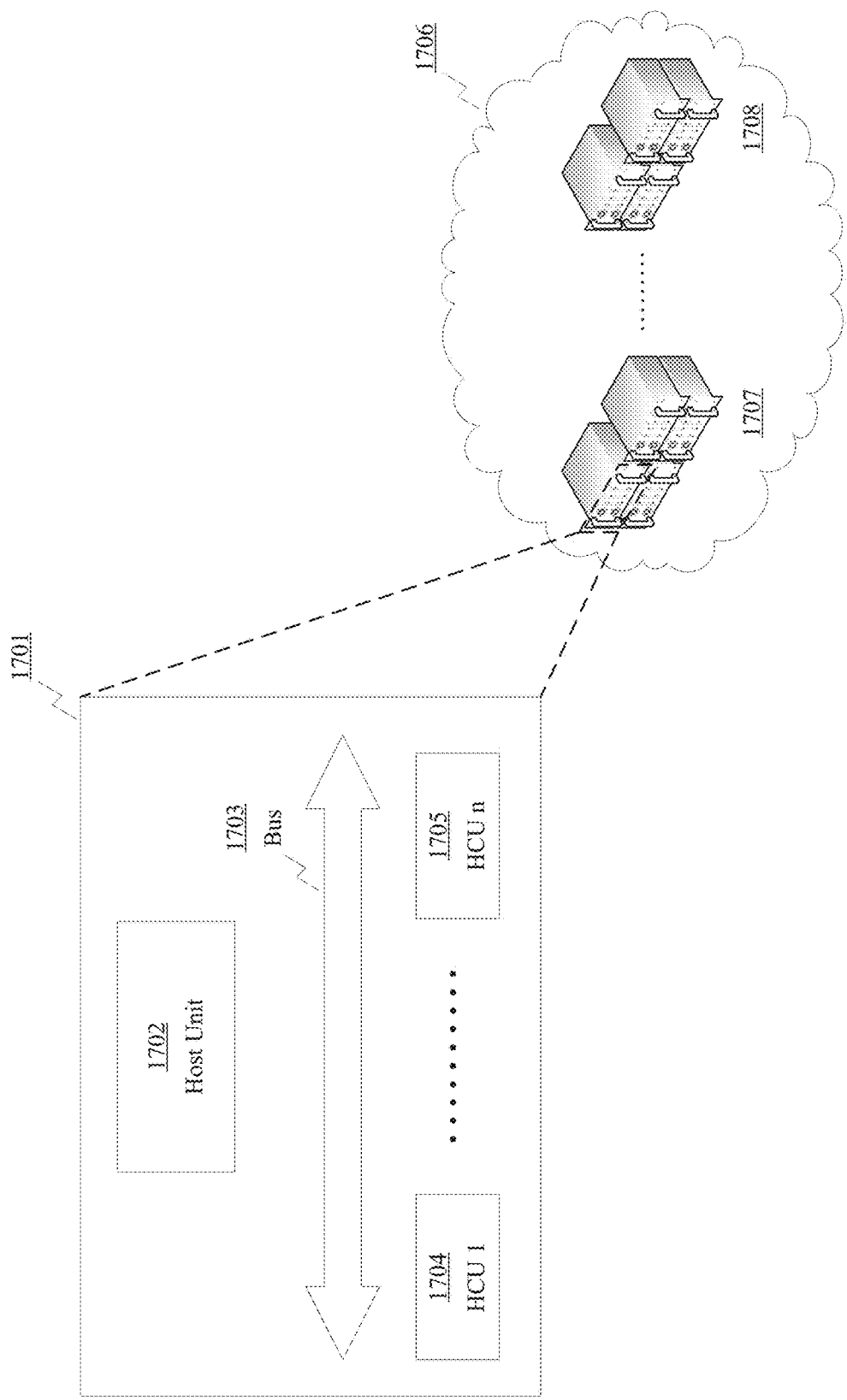
FIG. 17 illustrates a schematic diagram of an exemplary cloud system incorporating an accelerator, according to embodiments of the present disclosure.

FIG. 17 illustrates a schematic diagram of an exemplary cloud system 1706 incorporating neural network processing architecture 1701, according to embodiments of the present disclosure. As shown in FIG. 17, cloud system 1706 can provide cloud service with artificial intelligence (AI) capabilities and can include a plurality of computing servers (e.g., computing servers 1707 and 1708). In some embodiments, a computing server 1707 can, for example, incorporate accelerator architectures 1400 (FIG. 14) or 1600 (FIG. 16). Neural network processing architecture 1701 is shown in FIG. 17 as a simplified version of accelerator architecture 1600 for simplicity and clarity.

With the assistance of neural network processing architecture 1600, cloud system 1706 can provide the extended AI capabilities of image recognition, facial recognition, translations, 3D modeling, and the like. It is appreciated that, neural network processing architecture 1600 can be deployed to computing devices in other forms. For example, neural network processing architecture 1600 can also be integrated in a computing device, such as a smart phone, a tablet, and a wearable device. Moreover, while a specific architecture is shown in FIGS. 14-17, it is appreciated that any HCU or any accelerator that provides the ability to perform parallel computation can be used.

FIG. 18 is a simplified diagram illustrating how the selecting and prefetching of pages of data in an n-level sub-array may be decided and performed by a host system, such as through a device driver. More precisely, FIG. 18 shows how a driver 1810 for an accelerator 1801 may be executed by CPU 1822 of host system 1821 to allow the host 1820 to interface with the accelerator 1801. In particular, host system 1821 may utilize the memory management component 1811 of driver 1810 to determine what pages to prefetch alongside the first page of data referenced in the page fault. According to FIG. 18, GMMU 1803 of graphical processing unit (GPU) 1802 may send information on a page fault to the memory management component 1811 of driver 1810, along with kernel information (e.g., information about the kernel that triggered the page fault) and memory state information (e.g., information on the memory usage of the accelerator's primary storage unit).

Memory management component 1811 may respond to the page fault through page fault handler 1813, which may determine if the page of data referenced in a page fault corresponds to part of an array. If page fault handler 1813 determines that the page of data does correspond to part of an array, page fault handler 1837 may trigger memory management component 1811 to use accelerator activity handler 1815 to assess the activity of the accelerator based on the accelerator's memory stage and the kernel info (e.g., the information about the processes running on the accelerator). In some embodiments, accelerator activity handler 1815 may be software executed on CPU 1822 that analyzes the current state and usage the accelerator's PSU (or be provided this information as part of the page fault) to produce an assessment of the accelerator's activity.

Based on the activity assessment of accelerator activity handler 1815 and the pages requested in the page fault, array dividing handler 1817 may divide the array of data into sub-arrays until the division stopping condition is met. In some embodiments, array dividing handler 1817 may be software executed on CPU 1822 that uses the assessment produced by activity assessment handler 1815 to recursively divide the array into sub-arrays until the division stopping condition is met and to create metadata recording the bounds of each sub-array.

Next, PAV handler 1818 may then use the sub-arrays created by array dividing handler 1817 to recursively determine which sub-arrays meet the page access volume condition. PAV handler 1818 may select all pages in a sub-array for prefetching if that sub-array meets its page access volume condition. PAV handler 1818 may recursively perform this operation on the sub-array containing the first page of data until the page access volume condition is not met. Data migration control module 1814 may then retrieve the first page of data and any pages of data selected for prefetching. These pages may be retrieved from the memory subsystem 1823 of host system 1821, possibly by interfacing with CPU 1822. Finally, data migration control module 1814 may then transmit these pages (e.g., perform page migration) to GPU 1802.

In some embodiments, the division stopping condition could be determined—and potentially differ—for each level of sub-array. For example, in some embodiments, the division stopping condition may depend on the number of pages contained within the sub-array. In contrast, in some embodiments the division stopping condition may be the same for each level of sub-array (or be the same for certain groups of levels of sub-arrays). Similarly, in some embodiments the division stopping condition could be determined—and potentially differ—for each instance of responding to an attempt to access a page of data not stored on the accelerator's primary storage unit. In contrast, in some embodiments the division stopping condition may not be determined for every page fault. For example, in some embodiments the division stopping condition may be statically set for every kernel at the beginning of the kernel's execution. In other embodiments, the division stopping condition may instead only be altered at set intervals. For example, in some embodiments the division stopping condition may only be altered after a certain amount of time has passed or a certain number of page faults have occurred. Similarly, in some embodiments, the division stopping condition may be altered at the occurrence of certain events.

Additionally, in some embodiments, the division stopping condition could be set at the array (e.g., no dividing into sub-arrays is done) so that no pages are selected for prefetching. In some embodiments, this may be done when the accelerator's primary storage unit is nearing a certain capacity threshold (e.g., when less than 5% of the accelerator's PSU is unused). In some embodiments, the division stopping condition could be set at the array when the kernel utilizing the first page of data is nearing a certain amount of pages (in terms of data) stored on the accelerator's PSU. This may be in relative terms (e.g., when the kernel is using more than 40% of the accelerator's PSU's storage capacity) or in absolute terms (when the kernel is using more than 10 GiB of the accelerator's PSU).

In some embodiments, the division stopping condition may be based on an evaluation of how often—and to what extent—the sub-arrays meet the page access volume condition. This may be useful, for example, to detect if the instances where the sub-arrays are being divided to finely (e.g., if certain levels almost always meet the page access volume condition) or to detect instances where the sub-arrays are being divided to coarsely (e.g., if is frequently occurs that no sub-array meets the page access volume condition). In some embodiments, this may involve, for example, logging what sub-arrays are created and whether they meet the page access volume condition. These logs could also include a timestamp on when the process occurred, could only keep the x most recent entries, could only keep entries for a certain amount of time, or could only keep an entries for x number of instances of selecting pages for prefetching.

In some embodiments, the division stopping condition may be based on the division stopping condition used in responding to the previous page fault caused by the triggering kernel. Additionally, in some embodiments, the division stopping condition may also be based on an evaluation strategy. The evaluation strategy may include the criteria/algorithm by which the optimal level of granularity in assessing chunks of the array (e.g., the optimal size of the various sub-arrays) is determined. In some embodiments, the evaluation strategy may be based on an evaluation of the number of pages of data comprising the array that have already been retrieved and are currently stored on the accelerator's primary storage unit.

In some embodiments, the page access volume condition could be determined—and potentially differ—for each level of sub-array. For example, in some embodiments, the page access volume condition may depend on the number of pages contained within the sub-array. In contrast, in some embodiments, the page access volume condition may be the same for each level of sub-array (or be the same for certain groups of levels of sub-arrays). Similarly, in some embodiments the page access volume condition could be determined—and potentially differ—for each instance of responding to an attempt to access a page of data not stored on the accelerator's primary storage unit. In contrast, in some embodiments, the page access volume condition may not be determined for every page fault. For example, in some embodiments, the page access volume condition may be statically set for every kernel at the beginning of the kernel's execution. In other embodiments, the page access volume condition may instead only be altered at set intervals. For example, in some embodiments, the page access volume condition may only be altered after a certain amount of time has passed or a certain number of page faults have occurred. Similarly, in some embodiments, the page access volume condition may be altered at the occurrence of certain events.

Additionally, in some embodiments, the page access volume condition could be set so that no sub-array meets the page access volume condition. In some embodiments, this may be done when the accelerator's primary storage unit is nearing a certain capacity threshold (e.g., when less than 5% of the accelerator's PSU is unused). In some embodiments, the page access volume condition could be set at the array when the kernel utilizing the first page of data is nearing a certain amount of pages (in terms of data) stored on the accelerator's PSU. This may be in relative terms (e.g., when the kernel is using more than 40% of the accelerator's PSU's storage capacity) or in absolute terms (when the kernel is using more than 10GiB of the accelerator's PSU).

In some embodiments, the page access volume condition may be based on an evaluation of how often—and to what extent—the pages selected for prefetching have been fetched and subsequently evicted in a certain span of time. This may be useful, for example, to detect instances where the page access volume condition is set to low (e.g., if most pages selected for prefetching are not used before being evicted). In some embodiments, this may involve, for example, logging which pages are selected for prefetching and the page access volume condition used. It may also involve logging which pages are removed. These logs could also include a timestamp on when the removal occurred, could only keep the x most recent entries, could only keep entries for a certain amount of time, or could only keep an entries for x number of page fetches. In some embodiments, the log of removed pages could be periodically evaluated to determine whether the pages being prefetched are frequently evicted before being accessed.

In some embodiments, the page access volume condition may be based on the page access volume condition used in responding to the previous page fault caused by the triggering kernel. Additionally, in some embodiments may the page access volume condition may also be based on a fetching strategy. The fetching strategy may include the criteria/algorithm by which an optimal number of pages to be fetch/prefetched is determined and the optimal threshold to set the page access volume condition to achieve this. In some embodiments, the fetching strategy may be based on an evaluation of the memory access patterns of the triggering kernel.

In some embodiments, an attempt to access a page of data that is not stored on the accelerator's PSU (e.g., a page fault) may be responded to immediately. In some other embodiments, the page fault may not be responded to immediately. For example, in some embodiments, a page fault may only be responded to after a certain amount of time has passed since receiving the page fault. In some embodiments, a page fault may only be responded to at set intervals. For example, in some embodiments, the page fault may only be responded to every x number of microseconds.

In some embodiments, multiple attempts to access pages of data that are not stored on the accelerator's PSU may be coalesced (e.g., merged together). For example, in some embodiments, after receiving a first page fault, but before responding to it, a second page fault may be received from the same triggering kernel. In some embodiments, when multiple page faults from the same kernel have been received but not yet responded to, the two page faults may be coalesced together (e.g., by coalescing unit 1205 of FIG. 12 or by coalescing handler 1816 of FIG. 18). For instance, in some embodiments, the first page (referenced by the first page fault) and the second page (referenced by the second page fault) may be compared. If the two pages of data are sufficiently close to one another, the page access volume condition may be set so that the smallest sub-array containing both the first page of data and the second page of data meets the page access volume condition. This would ensure the second page of data is selected for prefetching along with the first page of data. Whether the page access volume condition may be set so that the smallest sub-array containing both pages of data will meet its page access volume condition may depend on the assessed activity of the accelerator. In some embodiments, if the page access volume condition is not set so that the smallest sub-array containing both pages of data will meet its page access volume condition, the page faults may not be coalesced.

Relatedly, in some embodiments, a second page fault may be received after a first page fault is received, the other pages of data are selected for prefetching, and the process of retrieving the pages of data has started. In this case, in some embodiments, it may be determined whether the page of data referenced in the second page fault is contained within the pages of data selected for prefetching in response to the first page fault. If the page referenced in the second page fault is included within the pages selected for prefetching, the second page fault may be coalesced with the first page fault, since the second page of data is already being retrieved as part of responding to the first page fault.

In some embodiments, the retrieval of the one or more pages of data was triggered by a kernel being executed on the accelerator attempting to access one or more of the referenced pages.

In some embodiments, the memory system from which the pages are retrieved may be the primary storage unit of a host system (e.g., the system in which the accelerator is operating). In some of these embodiments, both the accelerator and host system may be implementing a unified virtual memory system.

In some embodiments, the accelerator may be a graphics processing unit (GPU), a neural processing unit (NPU), a tensor processing unit (TPU), a field programmable gate array (FPGA), or an application-specific integrated circuit (ASIC), or other heterogeneous accelerator unit.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

It should be noted that, the relational terms herein such as "first" and "second" are used only to differentiate an entity or operation from another entity or operation, and do not require or imply any actual relationship or sequence between these entities or operations. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

It is appreciated that the above described embodiments can be implemented by hardware, or software (program codes), or a combination of hardware and software. If implemented by software, it may be stored in the above-described computer-readable media. The software, when executed by the processor can perform the disclosed methods. The devices, modules, and other functional units described in this disclosure can be implemented by hardware, or software, or a combination of hardware and software. One of ordinary skill in the art will also understand that the above described devices, modules, and other functions units may be combined or may be further divided into a plurality of sub-units.

The embodiments may further be described using the following clauses:

1. A method for fetching data for an accelerator, the method comprising:
  detecting an attempt to access a first page of data that is not stored on a primary storage unit of the accelerator, wherein the first page of data corresponds to part of an array with a number of dimensions; and
  responsive to detecting the attempt to access the first page of data:
    dividing the array into sub-arrays by:
      dividing the array into a number of 1st level sub-arrays, and
      dividing a first 1st level sub-array into a number of 2nd level sub-arrays, wherein the first 1st level sub-array contains the first page of data;
    selecting pages for prefetching, wherein selecting pages for prefetching includes selecting all pages in a first 2nd level sub-array for prefetching if the first 2nd level sub-array meets a page access volume condition, wherein the first 2nd level sub-array contains the first page of data; and
    transferring the first page of data and any pages of data selected for prefetching from a memory system connected to the accelerator into the primary storage unit.

2. The method of clause 1, wherein selecting pages for prefetching includes, subsequent to selecting all pages in the first 2nd level sub-array for prefetching:
  in response to the first 2nd level sub-array meeting the page access volume condition, selecting all pages in the first 1st level sub-array for prefetching if the first 1st level sub-array meets the page access volume condition.

3. The method of clause 2, wherein selecting pages for prefetching includes, subsequent to selecting all pages in the first 1st level sub-array for prefetching:
  in response to the first 1st level sub-array meeting the page access volume condition, selecting all pages in the array for prefetching if the array meets the page access volume condition.

4. The method of clause 3, further comprising:
  dividing the array into sub-arrays by, after dividing a first 1st level sub-array into a number of 2nd level sub-arrays, dividing a smallest n-level sub-array containing the first page of data into a number of (n+1)-level sub-arrays and continuing to recursively divide an (n+1)-level sub-array containing the first page of data until a division stopping condition is met, wherein:

k is the value of n when the division stopping condition is met, the value of n starts at 2 and ends at k; and selecting pages for prefetching by, prior to selecting all pages in the first 2nd level sub-array for prefetching:

selecting all pages in a m-level sub-array containing the first page of data for prefetching if the m-level sub-array meets the page access volume condition and continuing to recursively select all pages in an (m−1)-level sub-array containing the first page of data for prefetching if the (m−1)-level sub-array meets the page access volume condition until either the previous m-level sub-array does not meet the page access volume condition or the 2nd level sub-array is reached, wherein:

the value of m starts at k, and the pages in the first 2nd level sub-array are selected for prefetching only if, when the value of m is 3, an m-level sub-array containing the first page of data meets the page access volume condition and the first 2nd level sub-array meets the page access volume condition.

5. The method of any of clauses 1-4, wherein pages of data already selected for prefetching are included in determining the page access volume condition.

6. The method of any of clauses 1-5, wherein each level of sub-arrays have the same size as all of sub-arrays of the same level.

7. The method of any of clauses 1-6, wherein:

each level of sub-array has an amount of sub-arrays equal to $2^x$, and x is the number of dimensions of the array.

8. The method of any of clauses 4-7, wherein the division stopping condition includes:

reaching a particular level of sub-arrays, reaching sub-arrays below a certain size, or reaching sub-arrays containing less than a certain number of pages.

9. The method of any of clauses 1-8, wherein the page access volume condition includes:

having a threshold number of pages fetched or selected for prefetching, or having a threshold number of composing next lower level of sub-arrays meeting their page access volume condition.

10. The method of clause 9, wherein the page access volume condition requires all of the composing next lower level of sub-arrays meeting their page access volume condition when the amount of the accelerator's primary storage unit not being used by any kernel being executed on the accelerator is less than 5% of the storage unit's capacity.

11. The method of any of clauses 1-10, wherein the division stopping condition, page access volume condition, and the number of (i+1)-level sub-arrays an i-level sub-array is divided into are based on the number of pages composing the array.

12. The method of any of clauses 1-11, wherein:

the memory system is a primary storage unit of a host system, and the accelerator and host system use a unified virtual memory system.

13. The method of any of clauses 1-12, wherein detecting the attempt to access the first page of data comprises receiving a page fault triggered by a triggering kernel attempting to access the first page of data.

14. The method of clause 13, wherein the division stopping condition, page access volume condition, and the number of (i+1)-level sub-arrays an i-level sub-array is divided into are based on the number of pages being used by the triggering kernel.

15. The method of any of clauses 1-14, further comprising assessing activity of the accelerator, and wherein the division stopping condition, page access volume condition, and the number of (i+1)-level sub-arrays an i-level sub-array is divided into are based on the assessed activity of the accelerator.

16. The method of clause 15, wherein the activity of the accelerator comprises:

the amount of the accelerator's primary storage unit being used by a triggering kernel being executed on the accelerator, wherein the triggering kernel triggered the access to the first page of data, the amount of the accelerator's primary storage unit not being used by any kernel being executed on the accelerator that is not the triggering kernel, the amount of the accelerator's primary storage unit not being used by any kernel being executed on the accelerator that is not the triggering kernel, the amount of the accelerator's primary storage unit not being used by any kernel being executed on the accelerator that is not the triggering kernel, the memory access patterns amount of the triggering kernel, or the memory access patterns of any kernel being executed on the accelerator that is not the triggering kernel.

17. A system for fetching data for an accelerator, the system comprising:

a primary storage unit configured to hold a plurality of pages of data;

a detection unit configured to detect an attempt to access a first page of data that is not stored on the primary storage unit, wherein the first page of data corresponds to part of an array with a number of dimensions;

an array dividing unit configured to:

divide the array into a number of 1st level sub-arrays, and divide a first 1st level sub-array into a number of 2nd level sub-arrays, wherein the first 1st level sub-array contains the first page of data;

a selection unit configured to select pages for prefetching, wherein selecting pages for prefetching includes selecting all pages in a first 2nd level sub-array for prefetching if the first 2nd level sub-array meets a page access volume condition, wherein the first 2nd level sub-array contains the first page of data; and a fetching unit configured to transfer the first page of data and any pages of data selected for prefetching from a memory system connected to the accelerator into the primary storage unit.

18. The system of clause 17, wherein selecting pages for prefetching includes, subsequent to selecting all pages in the first 2nd level sub-array for prefetching:

in response to the first 2nd level sub-array meeting the page access volume condition, selecting all pages in the first 1st level sub-array for prefetching if the first 1st level sub-array meets the page access volume condition.

19. The system of clause 18, wherein selecting pages for prefetching includes, subsequent to selecting all pages in the first 1st level sub-array for prefetching:

in response to the first 1st level sub-array meeting the page access volume condition, selecting all pages in the array for prefetching if the array meets the page access volume condition.

20. The system of clause 19, wherein:

the array unit is further configured to, after dividing a first 1st level sub-array into a number of 2nd level sub-arrays, divide a smallest n-level sub-array containing the first page of data into a number of (n+1)-level sub-arrays and continue to recursively divide an (n+1)-level sub-array containing the first page of data until a division stopping condition is met, wherein:

k is the value of n when the division stopping condition is met, the value of n starts at 2 and ends at k; and the selection unit is further configured to, prior to selecting all pages in the first 2nd level sub-array for prefetching:

select all pages in a m-level sub-array containing the first page of data for prefetching if the m-level sub-array meets the page access volume condition and continue to recursively select all pages in an (m−1)-level sub-array containing the first page of data for prefetching if the (m−1)-level sub-array meets the page access volume condition until either the previous m-level sub-array does not meet the page access volume condition or the 2nd level sub-array is reached, wherein:

the value of m starts at k, and the pages in the first 2nd level sub-array are selected for prefetching only if, when the value of m is 3, an m-level sub-array containing the first page of data meets the page access volume condition and the first 2nd level sub-array meets the page access volume condition.

21. The system of any of clauses 17-20, wherein:

each level of sub-array has an amount of sub-arrays equal to $2^x$, and x is the number of dimensions of the array.

22. The system of any of clauses 17-21, wherein detecting the attempt to access the first page of data comprises receiving a page fault triggered by a triggering kernel attempting to access the first page of data.

23. The system of any of clauses 17-22, further comprising an assessment unit configured to assess activity of the accelerator, and wherein the division stopping condition, page access volume condition, and the number of (i+1)-level sub-arrays an i-level sub-array is divided into are based on the assessed activity of the accelerator.

24. A non-transitory computer readable medium that stores a set of instructions that is executable by at least one processor of a computer system to cause the computer system to perform a method for fetching data for an accelerator, the method comprising:

detecting an attempt to access a first page of data that is not stored on a primary storage unit of the accelerator, wherein the first page of data corresponds to part of an array with a number of dimensions; and responsive to detecting the attempt to access the first page of data:

dividing the array into sub-arrays by:

dividing the array into a number of 1st level sub-arrays, and dividing a first 1st level sub-array into a number of 2nd level sub-arrays, wherein the first 1st level sub-array contains the first page of data;

selecting pages for prefetching, wherein selecting pages for prefetching includes selecting all pages in a first 2nd level sub-array for prefetching if the first 2nd level sub-array meets a page access volume condition, wherein the first 2nd level sub-array contains the first page of data; and transferring the first page of data and any pages of data selected for prefetching from a memory system connected to the accelerator into the primary storage unit.

25. The non-transitory computer readable medium of clause 24, wherein selecting pages for prefetching includes, subsequent to selecting all pages in the first 2nd level sub-array for prefetching:

in response to the first 2nd level sub-array meeting the page access volume condition, selecting all pages in the first 1st level sub-array for prefetching if the first 1st level sub-array meets the page access volume condition.

26. The non-transitory computer readable medium of clause 25, wherein selecting pages for prefetching includes, subsequent to selecting all pages in the first 1st level sub-array for prefetching:

in response to the first 1st level sub-array meeting the page access volume condition, selecting all pages in the array for prefetching if the array meets the page access volume condition.

27. The non-transitory computer readable medium of clause 26, wherein the set of instructions is executable by the at least one processor of the computer system to cause the computer system to further perform:

dividing the array into sub-arrays by, after dividing a first 1st level sub-array into a number of 2nd level sub-arrays, dividing a smallest n-level sub-array containing the first page of data into a number of (n+1)-level sub-arrays and continuing to recursively divide an (n+1)-level sub-array containing the first page of data until a division stopping condition is met, wherein:

k is the value of n when the division stopping condition is met, the value of n starts at 2 and ends at k; and selecting pages for prefetching by, prior to selecting all pages in the first 2nd level sub-array for prefetching:

selecting all pages in a m-level sub-array containing the first page of data for prefetching if the m-level sub-array meets the page access volume condition and continuing to recursively select all pages in an (m−1)-level sub-array containing the first page of data for prefetching if the (m−1)-level sub-array meets the page access volume condition until either the previous m-level sub-array does not meet the page access volume condition or the 2nd level sub-array is reached, wherein:

the value of m starts at k, and the pages in the first 2nd level sub-array are selected for prefetching only if, when the value of m is 3, an m-level sub-array containing the first page of data meets the page access volume condition and the first 2nd level sub-array meets the page access volume condition.

28. The non-transitory computer readable medium of any of clauses 24-27, wherein:

each level of sub-array has an amount of sub-arrays equal to $2^x$, and x is the number of dimensions of the array.

29. The non-transitory computer readable medium of any of clauses 24-28, wherein detecting the attempt to access the first page of data comprises receiving a page fault triggered by a triggering kernel attempting to access the first page of data.

30. The non-transitory computer readable medium of any of clauses 24-29, wherein
the set of instructions is executable by the at least one processor of the computer system to cause the computer system to further perform assessing activity of the accelerator, and
wherein the division stopping condition, page access volume condition, and the number of (i+1)-level sub-arrays an i-level sub-array is divided into are based on the assessed activity of the accelerator.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

In the drawings and specification, there have been disclosed exemplary embodiments. However, many variations and modifications can be made to these embodiments. Accordingly, although specific terms are employed, they are used in a generic and descriptive sense only and not for purposes of limitation.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A method for fetching data for an accelerator, the method comprising:
detecting an attempt to access a first page of data that is not stored on a primary storage unit of the accelerator, wherein the first page of data corresponds to part of an array with a number of dimensions; and
responsive to detecting the attempt to access the first page of data:
dividing the array into sub-arrays until a division stopping condition met by:
dividing the array into a number of 1st level sub-arrays, and
dividing a first 1st level sub-array into a number of 2nd level sub-arrays,
wherein the first 1st level sub-array contains the first page of data;
selecting pages for prefetching, wherein selecting pages for prefetching includes selecting all pages in a first 2nd level sub-array for prefetching if the first 2nd level sub-array meets a page access volume condition, wherein the first 2nd level sub-array contains the first page of data; and
transferring the first page of data and any pages of data selected for prefetching from a memory system connected to the accelerator into the primary storage unit,
each level of sub-array has an amount of sub-arrays equal to $2^x$, and
x is the number of dimensions of the array.

2. The method of claim 1, wherein selecting pages for prefetching includes, subsequent to selecting all pages in the first 2nd level sub-array for prefetching:
in response to the first 2nd level sub-array meeting the page access volume condition, selecting all pages in the first 1st level sub-array for prefetching if the first 1st level sub-array meets the page access volume condition.

3. The method of claim 2, wherein selecting pages for prefetching includes, subsequent to selecting all pages in the first 1st level sub-array for prefetching:
in response to the first 1st level sub-array meeting the page access volume condition, selecting all pages in the array for prefetching if the array meets the page access volume condition.

4. The method of claim 3, further comprising:
dividing the array into sub-arrays by, after dividing a first 1st level sub-array into a number of 2nd level sub-arrays, dividing a smallest n-level sub-array containing the first page of data into a number of (n+1)-level sub-arrays and continuing to recursively divide an (n+1)-level sub-array containing the first page of data is until the division stopping condition met, wherein:
k is the value of n when the division stopping condition is met,
the value of n starts at 2 and ends at k; and
selecting pages for prefetching by, prior to selecting all pages in the first 2nd level sub-array for prefetching:
selecting all pages in a m-level sub-array containing the first page of data for prefetching if the m-level sub-array meets the page access volume condition and continuing to recursively select all pages in an (m−1)-level sub-array containing the first page of data for prefetching if the (m−1)-level sub-array meets the page access volume condition until either the previous m-level sub-array does not meet the page access volume condition or the 2nd level sub-array is reached, wherein:
the value of m starts at k, and
the pages in the first 2nd level sub-array are selected for prefetching only if, when the value of m is 3, an m-level sub-array containing the first page of data meets the page access volume condition and the first 2nd level sub-array meets the page access volume condition.

5. The method of claim 4, wherein the division stopping condition includes:
reaching a particular level of sub-arrays,
reaching sub-arrays below a certain size, or
reaching sub-arrays containing less than a certain number of pages.

6. The method of claim 1, wherein pages of data already selected for prefetching are included in determining the page access volume condition.

7. The method of claim 1, wherein each level of sub-arrays have the same size as all of sub-arrays of the same level.

8. The method of claim 1, wherein the page access volume condition includes:
having a threshold number of pages fetched or selected for prefetching, or
having a threshold number of composing next lower level of sub-arrays meeting their page access volume condition.

9. The method of claim 8, wherein the page access volume condition requires all of the composing next lower level of sub-arrays meeting their page access volume condition when the amount of the accelerator's primary storage unit not being used by any kernel being executed on the accelerator is less than 5% of the storage unit's capacity.

10. The method of claim 1, wherein the division stopping condition, page access volume condition, and the number of (i+1)-level sub-arrays an i-level sub-array is divided into are based on the number of pages composing the array.

11. The method of claim 1, wherein:
the memory system is a primary storage unit of a host system, and
the accelerator and host system use a unified virtual memory system.

12. The method of claim 1, wherein detecting the attempt to access the first page of data comprises receiving a page fault triggered by a triggering kernel attempting to access the first page of data.

13. The method of claim 12, wherein the division stopping condition, page access volume condition, and the number of (i+1)-level sub-arrays an i-level sub-array is divided into are based on the number of pages being used by the triggering kernel.

14. The method of claim 1, further comprising assessing activity of the accelerator, and wherein the division stopping condition, page access volume condition, and the number of (i+1)-level sub-arrays an i-level sub-array is divided into are based on the assessed activity of the accelerator.

15. The method of claim 14, wherein the activity of the accelerator comprises:
the amount of the accelerator's primary storage unit being used by a triggering kernel being executed on the accelerator, wherein the triggering kernel triggered the access to the first page of data,
the amount of the accelerator's primary storage unit not being used by any kernel being executed on the accelerator that is not the triggering kernel,
the amount of the accelerator's primary storage unit not being used by any kernel being executed on the accelerator that is not the triggering kernel,
the amount of the accelerator's primary storage unit not being used by any kernel being executed on the accelerator that is not the triggering kernel,
the memory access patterns amount of the triggering kernel, or
the memory access patterns of any kernel being executed on the accelerator that is not the triggering kernel.

16. A system for fetching data for an accelerator, the system comprising:
a primary storage unit configured to hold a plurality of pages of data;
a detection unit configured to detect an attempt to access a first page of data that is not stored on the primary storage unit, wherein the first page of data corresponds to part of an array with a number of dimensions;
an array dividing unit configured to divide the array into sub-arrays until a division stopping condition met by:
dividing the array into a number of 1st level sub-arrays, and
dividing a first 1st level sub-array into a number of 2nd level sub-arrays, wherein the first 1st level sub-array contains the first page of data;
a selection unit configured to select pages for prefetching, wherein selecting pages for prefetching includes selecting all pages in a first 2nd level sub-array for prefetching if the first 2nd level sub-array meets a page access volume condition, wherein the first 2nd level sub-array contains the first page of data; and
a fetching unit configured to transfer the first page of data and any pages of data selected for prefetching from a memory system connected to the accelerator into the primary storage unit,
each level of sub-array has an amount of sub-arrays equal to $2^x$, and
x is the number of dimensions of the array.

17. The system of claim 16, wherein selecting pages for prefetching includes, subsequent to selecting all pages in the first 2nd level sub-array for prefetching:
in response to the first 2nd level sub-array meeting the page access volume condition, selecting all pages in the first 1st level sub-array for prefetching if the first 1st level sub-array meets the page access volume condition.

18. The system of claim 17, wherein selecting pages for prefetching includes, subsequent to selecting all pages in the first 1st level sub-array for prefetching:
in response to the first 1st level sub-array meeting the page access volume condition, selecting all pages in the array for prefetching if the array meets the page access volume condition.

19. The system of claim 18, wherein:
the array unit is further configured to, after dividing a first 1st level sub-array into a number of 2nd level sub-arrays, divide a smallest n-level sub-array containing the first page of data into a number of (n+1)-level sub-arrays and continue to recursively divide an (n+1)-level sub-array containing the first page of data until the division stopping condition is met, wherein:
k is the value of n when the division stopping condition is met,
the value of n starts at 2 and ends at k; and
the selection unit is further configured to, prior to selecting all pages in the first 2nd level sub-array for prefetching:
select all pages in a m-level sub-array containing the first page of data for prefetching if the m-level sub-array meets the page access volume condition and continue to recursively select all pages in an (m−1)-level sub-array containing the first page of data for prefetching if the (m−1)-level sub-array meets the page access volume condition until either the previous m-level sub-array does not meet the page access volume condition or the 2nd level sub-array is reached, wherein:
the value of m starts at k, and
the pages in the first 2nd level sub-array are selected for prefetching only if, when the value of m is 3, an m-level sub-array containing the first page of data meets the page access volume condition and the first 2nd level sub-array meets the page access volume condition.

20. The system of claim 16, wherein detecting the attempt to access the first page of data comprises receiving a page fault triggered by a triggering kernel attempting to access the first page of data.

21. The system of claim 16, further comprising an assessment unit configured to assess activity of the accelerator, and wherein the division stopping condition, page access volume condition, and the number of (i+1)-level sub-arrays an i-level sub-array is divided into are based on the assessed activity of the accelerator.

22. A non-transitory computer readable medium that stores a set of instructions that is executable by at least one processor of a computer system to cause the computer system to perform a method for fetching data for an accelerator, the method comprising:
   detecting an attempt to access a first page of data that is not stored on a primary storage unit of the accelerator, wherein the first page of data corresponds to part of an array with a number of dimensions; and
   responsive to detecting the attempt to access the first page of data:
      dividing the array into sub-arrays until a division stopping condition met by:
         dividing the array into a number of 1st level sub-arrays, and
         dividing a first 1st level sub-array into a number of 2nd level sub-arrays,
      wherein the first 1st level sub-array contains the first page of data;
      selecting pages for prefetching, wherein selecting pages for prefetching includes selecting all pages in a first 2nd level sub-array for prefetching if the first 2nd level sub-array meets a page access volume condition, wherein the first 2nd level sub-array contains the first page of data; and
      transferring the first page of data and any pages of data selected for prefetching from a memory system connected to the accelerator into the primary storage unit,
      each level of sub-array has an amount of sub-arrays equal to $2^x$, and
      x is the number of dimensions of the array.

23. The non-transitory computer readable medium of claim 22, wherein selecting pages for prefetching includes, subsequent to selecting all pages in the first 2nd level sub-array for prefetching:
   in response to the first 2nd level sub-array meeting the page access volume condition, selecting all pages in the first 1st level sub-array for prefetching if the first 1st level sub-array meets the page access volume condition.

24. The non-transitory computer readable medium of claim 23, wherein selecting pages for prefetching includes, subsequent to selecting all pages in the first 1st level sub-array for prefetching:
   in response to the first 1st level sub-array meeting the page access volume condition, selecting all pages in the array for prefetching if the array meets the page access volume condition.

25. The non-transitory computer readable medium of claim 24, wherein the set of instructions is executable by the at least one processor of the computer system to cause the computer system to further perform:
   dividing the array into sub-arrays by, after dividing a first 1st level sub-array into a number of 2nd level sub-arrays, dividing a smallest n-level sub-array containing the first page of data into a number of (n+1)-level sub-arrays and continuing to recursively divide an (n+1)-level sub-array containing the first page of data until the division stopping condition is met, wherein:
      k is the value of n when the division stopping condition is met,
      the value of n starts at 2 and ends at k; and
   selecting pages for prefetching by, prior to selecting all pages in the first 2nd level sub-array for prefetching:
      selecting all pages in a m-level sub-array containing the first page of data for prefetching if the m-level sub-array meets the page access volume condition and continuing to recursively select all pages in an (m−1)-level sub-array containing the first page of data for prefetching if the (m−1)-level sub-array meets the page access volume condition until either the previous m-level sub-array does not meet the page access volume condition or the 2nd level sub-array is reached, wherein:
         the value of m starts at k, and
         the pages in the first 2nd level sub-array are selected for prefetching only if, when the value of m is 3, an m-level sub-array containing the first page of data meets the page access volume condition and the first 2nd level sub-array meets the page access volume condition.

26. The non-transitory computer readable medium of claim 22, wherein detecting the attempt to access the first page of data comprises receiving a page fault triggered by a triggering kernel attempting to access the first page of data.

27. The non-transitory computer readable medium of claim 22, wherein the set of instructions is executable by the at least one processor of the computer system to cause the computer system to further perform assessing activity of the accelerator, and wherein the division stopping condition, page access volume condition, and the number of (i+1)-level sub-arrays an i-level sub-array is divided into are based on the assessed activity of the accelerator.

* * * * *